(12) United States Patent
Lecocq et al.

(10) Patent No.: US 10,607,404 B2
(45) Date of Patent: Mar. 31, 2020

(54) DEVICE AND METHOD FOR ESTIMATING A GLOSSY PART OF RADIATION

(71) Applicant: THOMSON LICENSING, Issy les Moulineaux (FR)

(72) Inventors: Pascal Lecocq, Saint Gregoire (FR); Gael Sourimant, Rennes (FR); Jean-Eudes Marvie, Betton (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 257 days.

(21) Appl. No.: 15/044,083

(22) Filed: Feb. 15, 2016

(65) Prior Publication Data
US 2016/0239998 A1    Aug. 18, 2016

(30) Foreign Application Priority Data
Feb. 16, 2015   (EP) ..................... 15305229

(51) Int. Cl.
*G06T 15/83*    (2011.01)
*G06T 15/50*    (2011.01)
(Continued)

(52) U.S. Cl.
CPC ............ *G06T 15/83* (2013.01); *G06T 1/20* (2013.01); *G06T 15/506* (2013.01); *G06T 15/55* (2013.01)

(58) Field of Classification Search
CPC ......... G06T 15/83; G06T 1/20; G06T 15/506; G06T 15/55
See application file for complete search history.

(56) References Cited

U.S. PATENT DOCUMENTS 4,318,844 A * 3/1982 Kohler ................. C09C 1/3692
                                                                106/262
4,928,250 A * 5/1990 Greenberg ............. G06T 15/55
                                                                345/426
(Continued)

FOREIGN PATENT DOCUMENTS

EP      91347419    *  9/2003
JP      H11203501      7/1999

OTHER PUBLICATIONS

Oktatasi, Phong Reflection Model, Apr. 2, 2012, ftp://www.inflab.bme.hu/pub/oktatas/XNA%20programozas/Phong%20reflection%20model.pdf (Year: 2012).*

(Continued)

*Primary Examiner* — James A Thompson
*Assistant Examiner* — Charles L Beard
(74) *Attorney, Agent, or Firm* — Meagher Emanuel Laks Goldberg & Liao, LLP

(57) ABSTRACT

The present invention relates to a glossy part of radiation is estimated coming from a surface illuminated by area light source(s) having source surface(s) (A) bounded by edge curves, by determining integrand function(s) representative of that glossy part. The latter corresponding to an integration of the integrand function along the edge curves. In this respect, the integrand function(s) is/are approximated by means of peak-shape function(s) having a known antiderivative over the edge curves, and the glossy part is computed from analytical expressions associated with integrations of the peak-shape function(s) along the edge curves. Such invention can offer efficient and accurate computation for specular part of reflection as well as glossy transmission, and is notably relevant to real-time rendering.

22 Claims, 9 Drawing Sheets

(51) Int. Cl.
*G06T 1/20* (2006.01)
*G06T 15/55* (2011.01)

(56) References Cited

U.S. PATENT DOCUMENTS

| | | | | |
|---|---|---|---|---|
| 5,163,126 A * | 11/1992 | Einkauf | G06T 15/87 345/423 |
| 5,253,339 A * | 10/1993 | Wells | G06T 15/83 345/426 |
| 5,426,506 A * | 6/1995 | Ellingson | G01N 21/88 250/225 |
| 5,461,549 A * | 10/1995 | Lietar | F21S 48/1364 362/211 |
| 5,473,014 A * | 12/1995 | Ando | C08F 287/00 525/316 |
| 5,488,700 A * | 1/1996 | Glassner | G06T 15/506 345/426 |
| 5,563,989 A * | 10/1996 | Billyard | G06T 15/506 345/426 |
| 5,659,671 A * | 8/1997 | Tannenbaum | G06T 15/506 345/426 |
| 5,704,024 A * | 12/1997 | Voorhies | G06T 15/506 345/426 |
| 5,739,820 A * | 4/1998 | Lyon | G06T 15/50 345/426 |
| 5,777,620 A * | 7/1998 | Billyard | G06T 15/506 345/426 |
| 5,870,096 A * | 2/1999 | Anjyo | G06T 15/00 345/426 |
| 5,966,134 A * | 10/1999 | Arias | G06T 13/20 345/426 |
| 5,990,941 A * | 11/1999 | Jackson | G06T 3/0062 348/207.99 |
| 6,040,835 A * | 3/2000 | Gibson | G06T 15/50 345/424 |
| 6,157,730 A * | 12/2000 | Roever | G01N 21/89 382/110 |
| 6,166,810 A * | 12/2000 | Nakayama | G01B 11/026 356/624 |
| 6,175,367 B1 * | 1/2001 | Parikh | G06T 15/506 345/426 |
| 6,226,007 B1 * | 5/2001 | Brown | G06T 15/506 345/426 |
| 6,268,860 B1 * | 7/2001 | Bonello | G06T 15/506 345/426 |
| 6,268,871 B1 * | 7/2001 | Rice | G06T 11/203 345/442 |
| 6,320,581 B1 * | 11/2001 | Browne | G06T 15/80 345/423 |
| 6,342,885 B1 * | 1/2002 | Knittel | G06T 15/50 345/424 |
| 6,400,842 B2 * | 6/2002 | Fukuda | G06T 15/506 382/162 |
| 6,529,193 B1 * | 3/2003 | Herken | G06T 15/50 345/426 |
| 6,583,790 B1 * | 6/2003 | Wolters | G06T 15/04 345/584 |
| 6,677,942 B1 * | 1/2004 | Rushmeier | G06T 17/20 345/420 |
| 6,686,921 B1 * | 2/2004 | Rushmeier | G06T 17/10 345/423 |
| 6,781,594 B2 * | 8/2004 | Day | G06T 5/006 345/426 |
| 6,900,805 B2 * | 5/2005 | Thornber | G06K 9/00275 345/426 |
| 7,006,684 B2 * | 2/2006 | Thornber | G06K 9/4661 345/426 |
| 7,058,217 B2 * | 6/2006 | Thornber | G06K 9/4661 382/115 |
| 7,075,534 B2 * | 7/2006 | Cole | G06T 15/506 345/426 |
| 7,079,138 B2 * | 7/2006 | Day | G06T 5/006 345/426 |
| 7,091,973 B1 * | 8/2006 | Cohen | G06T 15/50 345/426 |
| 7,119,903 B1 * | 10/2006 | Jones | G01N 21/47 356/446 |
| 7,123,257 B2 * | 10/2006 | Sawada | G06T 15/50 345/420 |
| 7,123,259 B2 * | 10/2006 | Cabral | G06T 15/04 345/426 |
| 7,133,052 B1 * | 11/2006 | Silva | G06T 3/0093 345/646 |
| 7,277,572 B2 * | 10/2007 | MacInnes | G06F 17/5004 345/419 |
| 7,408,550 B2 * | 8/2008 | Bunnell | G06T 15/506 345/426 |
| 7,508,391 B2 * | 3/2009 | Birdwell | G06T 15/50 345/426 |
| 7,696,995 B2 * | 4/2010 | McTaggart | G06T 15/506 345/426 |
| 7,773,088 B2 * | 8/2010 | Keller | G06T 15/50 345/426 |
| 7,786,993 B2 * | 8/2010 | Cerny | G06T 15/506 345/419 |
| 8,164,593 B2 * | 4/2012 | Sun | G06T 9/00 345/426 |
| 8,164,594 B2 * | 4/2012 | Watanabe | G06T 15/60 345/426 |
| 8,232,993 B2 * | 7/2012 | Sun | G06T 15/50 345/419 |
| 8,294,713 B1 * | 10/2012 | Amanieux | G06T 15/50 345/419 |
| 8,436,855 B1 * | 5/2013 | Morgan | G06T 15/80 345/419 |
| 8,538,183 B1 * | 9/2013 | d'Eon | G06T 15/506 345/615 |
| 8,587,589 B2 * | 11/2013 | Collomb | G06T 15/50 345/419 |
| 8,638,331 B1 * | 1/2014 | Jarosz | G06T 15/06 345/426 |
| 8,711,171 B2 * | 4/2014 | Sano | G01J 3/504 345/589 |
| 8,803,880 B2 * | 8/2014 | Zhou | G06T 15/506 345/426 |
| 8,805,088 B1 * | 8/2014 | Mesolongitis | G06K 17/00 382/216 |
| 9,098,945 B2 * | 8/2015 | Wang | G06T 15/506 |
| 9,153,065 B2 * | 10/2015 | Collins | G06T 15/60 |
| 9,275,477 B2 * | 3/2016 | Tokuyoshi | G06T 15/506 |
| 9,280,848 B1 * | 3/2016 | Chen | G06T 15/506 |
| 9,489,770 B2 * | 11/2016 | Iwamoto | G06T 17/10 |
| 9,508,190 B2 * | 11/2016 | Zhang | G06T 15/20 |
| 9,509,905 B2 * | 11/2016 | Gordon | H04N 5/2354 |
| 9,619,924 B2 * | 4/2017 | Spencer | G06T 15/50 |
| 9,626,794 B2 * | 4/2017 | Tokuyoshi | G06T 15/506 |
| 9,638,978 B2 * | 5/2017 | Brown | G02F 1/163 |
| 9,684,975 B2 * | 6/2017 | Baker | G06T 11/001 |
| 9,818,220 B2 * | 11/2017 | Schroecker | G06T 15/08 |
| 9,836,876 B1 * | 12/2017 | Koylazov | G06T 15/506 |
| 9,905,045 B1 * | 2/2018 | Hery | G06T 15/506 |
| 10,055,882 B2 * | 8/2018 | Marin | G06T 11/001 |
| 10,229,483 B2 * | 3/2019 | Doba | G03B 15/02 |
| 10,445,607 B2 * | 10/2019 | Rephaeli | G01J 3/10 |
| 2001/0040999 A1 * | 11/2001 | Fukuda | G06T 15/506 382/162 |
| 2001/0045956 A1 * | 11/2001 | Hurley | G06T 15/506 345/582 |
| 2002/0080136 A1 * | 6/2002 | Kouadio | G06T 15/04 345/426 |
| 2002/0171826 A1 * | 11/2002 | Wiles | G01N 21/57 356/237.2 |
| 2003/0011596 A1 * | 1/2003 | Zhang | G06T 15/506 345/426 |
| 2003/0016539 A1 * | 1/2003 | Minano | F21V 7/04 362/347 |
| 2003/0030639 A1 * | 2/2003 | Ritter | G06T 15/04 345/426 |

(56) References Cited

U.S. PATENT DOCUMENTS

| | | | |
|---|---|---|---|
| 2003/0052893 A1* | 3/2003 | Sawada | G06T 15/50 345/589 |
| 2003/0063793 A1* | 4/2003 | Thornber | G06K 9/4661 382/154 |
| 2003/0104358 A1* | 6/2003 | Polansky | A61K 45/06 435/5 |
| 2003/0128207 A1* | 7/2003 | Sawada | G06T 7/514 345/419 |
| 2003/0234786 A1* | 12/2003 | Cole | G06T 15/506 345/426 |
| 2004/0002380 A1* | 1/2004 | Brosnan | A63F 13/10 463/32 |
| 2004/0041809 A1* | 3/2004 | Thornber | G06K 9/00275 345/426 |
| 2004/0061700 A1* | 4/2004 | Shioya | G06T 15/50 345/426 |
| 2004/0086694 A1* | 5/2004 | Ide | G03C 5/04 428/195.1 |
| 2004/0109000 A1* | 6/2004 | Chosokabe | G06T 15/506 345/426 |
| 2004/0155879 A1* | 8/2004 | Mittring | G06T 15/506 345/426 |
| 2004/0169648 A1* | 9/2004 | Sawada | G06T 15/04 345/419 |
| 2004/0189654 A1* | 9/2004 | Cabral | G06T 15/04 345/582 |
| 2004/0251418 A1* | 12/2004 | Gunter | G06F 15/16 250/369 |
| 2005/0003341 A1* | 1/2005 | Polansky | C12Q 1/6886 435/5 |
| 2005/0012757 A1* | 1/2005 | Park | G06T 15/205 345/582 |
| 2005/0212794 A1* | 9/2005 | Furukawa | G06T 11/001 345/419 |
| 2005/0255458 A1* | 11/2005 | Polansky | C12Q 1/6897 435/5 |
| 2005/0264564 A1* | 12/2005 | Keller | G06T 15/06 345/421 |
| 2006/0082778 A1* | 4/2006 | Paldus | G01N 21/39 356/437 |
| 2006/0132486 A1* | 6/2006 | Kim | G06T 15/506 345/420 |
| 2006/0146061 A1* | 7/2006 | Keller | G06T 15/06 345/581 |
| 2006/0274065 A1* | 12/2006 | Buyanovskiy | G06T 15/06 345/424 |
| 2007/0002047 A1* | 1/2007 | Desgranges | G06T 15/60 345/426 |
| 2007/0008310 A1* | 1/2007 | Hahn | G06T 15/506 345/419 |
| 2007/0018996 A1* | 1/2007 | Wang | G06T 15/50 345/592 |
| 2007/0046686 A1* | 3/2007 | Keller | G06F 17/10 345/581 |
| 2007/0273686 A1* | 11/2007 | Watanabe | G06T 15/506 345/419 |
| 2007/0299639 A1* | 12/2007 | Weese | G06T 15/06 703/2 |
| 2008/0016137 A1* | 1/2008 | Sun | G06T 15/50 708/400 |
| 2008/0018647 A1* | 1/2008 | Bunnell | G06T 13/00 345/426 |
| 2008/0029697 A1* | 2/2008 | Willis | H01J 49/0036 250/287 |
| 2008/0231729 A1* | 9/2008 | Sato | G06T 3/4053 348/229.1 |
| 2009/0006044 A1* | 1/2009 | Zhou | G06T 15/55 703/2 |
| 2009/0006046 A1* | 1/2009 | Zhou | G06T 15/55 703/2 |
| 2009/0006047 A1* | 1/2009 | Zhou | G06T 15/55 703/2 |
| 2009/0006051 A1* | 1/2009 | Zhou | G06T 15/506 703/5 |
| 2009/0006052 A1* | 1/2009 | Zhou | G06T 15/50 703/5 |
| 2009/0027390 A1* | 1/2009 | Bin Zafar | G06T 15/506 345/426 |
| 2009/0167763 A1* | 7/2009 | Waechter | G06T 15/06 345/426 |
| 2009/0169096 A1* | 7/2009 | Cipolla | G06T 7/557 382/154 |
| 2009/0228245 A1* | 9/2009 | Gilbert | G01N 30/8624 703/2 |
| 2009/0279807 A1* | 11/2009 | Kanamorl | G02B 5/3025 382/274 |
| 2009/0303247 A1* | 12/2009 | Zhang | G06T 15/20 345/594 |
| 2010/0094601 A1* | 4/2010 | Steenhoek | G01N 21/4738 703/2 |
| 2010/0103169 A1* | 4/2010 | Zhang | G01B 11/25 345/420 |
| 2010/0123784 A1* | 5/2010 | Ding | H04N 9/3191 348/189 |
| 2010/0277477 A1* | 11/2010 | Wang | G06T 15/506 345/426 |
| 2011/0007333 A1* | 1/2011 | Ishii | H04N 1/6033 358/1.9 |
| 2011/0027162 A1* | 2/2011 | Steiner, III | B82Y 30/00 423/440 |
| 2011/0054804 A1* | 3/2011 | Pfaff | G01N 30/72 702/25 |
| 2011/0056836 A1* | 3/2011 | Tatebe | C25D 11/16 205/50 |
| 2011/0122135 A1* | 5/2011 | Kim | G06T 1/20 345/426 |
| 2011/0161035 A1* | 6/2011 | Suzuki | G06F 17/18 702/95 |
| 2011/0214993 A1* | 9/2011 | Akana | C25D 5/00 205/50 |
| 2011/0227922 A1* | 9/2011 | Shim | G06T 15/50 345/426 |
| 2011/0234621 A1* | 9/2011 | Steenhoek | G01N 21/4738 345/589 |
| 2011/0250351 A1* | 10/2011 | Steenhoek | B32B 43/00 427/140 |
| 2011/0292669 A1* | 12/2011 | Albou | F21S 48/1159 362/517 |
| 2011/0299063 A1* | 12/2011 | Ninomiya | G01N 21/251 356/31 |
| 2011/0304705 A1* | 12/2011 | Kantor | A61B 5/0059 348/49 |
| 2011/0311107 A1* | 12/2011 | Levesque | G01B 11/24 382/106 |
| 2012/0086950 A1* | 4/2012 | Sho | G01B 11/2509 356/601 |
| 2012/0207404 A1* | 8/2012 | Robles-Kelly | G06K 9/4661 382/286 |
| 2012/0256923 A1* | 10/2012 | Gautron | G06T 15/50 345/426 |
| 2012/0300449 A1* | 11/2012 | Fields | F21V 7/0058 362/231 |
| 2013/0016100 A1* | 1/2013 | Bickel | G06T 17/00 345/420 |
| 2013/0021359 A1* | 1/2013 | Baker | G06T 11/001 345/584 |
| 2013/0027511 A1* | 1/2013 | Takemura | G06K 9/00798 348/42 |
| 2013/0066596 A1* | 3/2013 | Papas | G02B 27/0012 703/1 |
| 2013/0089256 A1* | 4/2013 | Tsukada | H04N 1/62 382/167 |
| 2013/0120384 A1* | 5/2013 | Jarosz | G06T 19/00 345/426 |
| 2013/0127889 A1* | 5/2013 | Winnemoeller | G06T 17/20 345/582 |
| 2013/0141451 A1* | 6/2013 | Child | G06T 15/04 345/582 |

(56) References Cited

U.S. PATENT DOCUMENTS

| | | | |
|---|---|---|---|
| 2013/0176313 A1* | 7/2013 | Gautron | G06T 15/50 345/426 |
| 2013/0193961 A1* | 8/2013 | Wen | G01J 1/0407 324/244.1 |
| 2013/0251243 A1* | 9/2013 | Shim | G06T 5/007 382/154 |
| 2013/0268212 A1* | 10/2013 | Makarov | H01J 49/025 702/32 |
| 2013/0291746 A1* | 11/2013 | Ikeda | B44C 1/175 101/368 |
| 2013/0301908 A1* | 11/2013 | Shim | G06T 5/005 382/154 |
| 2013/0308183 A1* | 11/2013 | Vermeirsch | G03B 21/62 359/451 |
| 2013/0338935 A1* | 12/2013 | Watanabe | H01J 49/0036 702/23 |
| 2013/0346041 A1* | 12/2013 | Gautron | G06F 17/5009 703/2 |
| 2014/0023258 A1* | 1/2014 | Imai | G06T 5/002 382/132 |
| 2014/0092307 A1* | 4/2014 | Fukuda | G06T 5/002 348/571 |
| 2014/0152662 A1* | 6/2014 | Nowrouzezahrai | G06T 15/06 345/426 |
| 2014/0267274 A1* | 9/2014 | Burley | G06T 15/506 345/426 |
| 2014/0267275 A1* | 9/2014 | Jarosz | G06T 15/06 345/426 |
| 2014/0293263 A1* | 10/2014 | Justice | G01S 17/42 356/4.01 |
| 2014/0327673 A1* | 11/2014 | Sousa | G06T 15/506 345/426 |
| 2014/0327912 A1* | 11/2014 | Kettler | G01N 21/57 356/445 |
| 2014/0333729 A1* | 11/2014 | Pflug | G06T 15/20 348/47 |
| 2014/0362081 A1* | 12/2014 | Cerny | G06T 15/005 345/426 |
| 2014/0362102 A1* | 12/2014 | Cerny | G06T 1/20 345/589 |
| 2015/0015887 A1* | 1/2015 | Tin | G01N 21/55 356/445 |
| 2015/0024337 A1* | 1/2015 | Blassnig | G06T 15/06 433/29 |
| 2015/0042652 A1* | 2/2015 | Keller | G06T 15/506 345/426 |
| 2015/0117758 A1* | 4/2015 | Chandraker | G06T 7/55 382/154 |
| 2015/0172636 A1* | 6/2015 | Gordon | H04N 5/2354 348/46 |
| 2015/0177833 A1* | 6/2015 | Vennstrom | G06F 3/013 345/156 |
| 2015/0178611 A1* | 6/2015 | Hennebelle | H03M 7/3059 235/469 |
| 2015/0198716 A1* | 7/2015 | Romano | G01S 7/48 356/614 |
| 2015/0281663 A1* | 10/2015 | Fukuda | G06T 5/003 348/571 |
| 2015/0379162 A1* | 12/2015 | MohammadBagher | G01N 21/55 703/1 |
| 2016/0005217 A1* | 1/2016 | Tokuyoshi | G06T 15/506 345/426 |
| 2016/0049001 A1* | 2/2016 | Anderson | G06T 17/05 345/419 |
| 2016/0084819 A1* | 3/2016 | Raunio | G06T 7/41 250/559.07 |
| 2016/0100122 A1* | 4/2016 | Nakajima | H04N 9/73 348/687 |
| 2016/0136735 A1* | 5/2016 | Matsuda | B23B 27/148 407/119 |
| 2016/0157828 A1* | 6/2016 | Sumi | G01S 15/8927 702/189 |
| 2016/0171754 A1* | 6/2016 | Ahn | G06T 15/506 345/426 |
| 2016/0210746 A1* | 7/2016 | Matsuda | G06T 7/0012 |
| 2016/0210754 A1* | 7/2016 | Ida | G06T 7/586 |
| 2016/0284068 A1* | 9/2016 | Rouh | G06T 5/002 |
| 2016/0300376 A1* | 10/2016 | Fuse | G06K 9/4661 |
| 2016/0307489 A1* | 10/2016 | Nakajima | H04N 9/3182 |
| 2016/0313446 A1* | 10/2016 | Fu | G01S 17/89 |
| 2016/0314613 A1* | 10/2016 | Nowozin | G06T 15/506 |
| 2016/0314614 A1* | 10/2016 | Bitterli | G06T 15/506 |
| 2016/0330493 A1* | 11/2016 | Chuah | G06T 15/04 |
| 2016/0371568 A1* | 12/2016 | Tin | G06K 9/6277 |
| 2017/0011496 A1* | 1/2017 | Lu | G06T 15/50 |
| 2017/0053433 A1* | 2/2017 | Gautron | G06T 17/20 |
| 2017/0082720 A1* | 3/2017 | Robert | G01J 1/44 |
| 2017/0099412 A1* | 4/2017 | Shimada | H04N 1/4052 |
| 2017/0192406 A1* | 7/2017 | Ashdown | H05B 37/0227 |
| 2017/0236325 A1* | 8/2017 | Lecocq | G06T 15/005 345/426 |
| 2017/0263046 A1* | 9/2017 | Patney | G06T 15/20 |
| 2017/0276476 A1* | 9/2017 | Konno | G01B 11/26 |
| 2017/0294042 A1* | 10/2017 | Engel | G06T 15/506 |
| 2017/0323474 A1* | 11/2017 | Chien | G06T 19/006 |
| 2017/0345208 A1* | 11/2017 | Ashdown | G06F 17/5004 |
| 2018/0047208 A1* | 2/2018 | Marin | G06T 11/001 |
| 2018/0068196 A1* | 3/2018 | Quentin | G06K 7/10861 |
| 2018/0068590 A1* | 3/2018 | Mattausch | G06F 17/10 |
| 2018/0122100 A1* | 5/2018 | Totsuka | G06T 7/97 |
| 2018/0137635 A1* | 5/2018 | Tamaazousti | G06T 15/83 |
| 2018/0150995 A1* | 5/2018 | Kaneko | G06T 15/506 |
| 2018/0225865 A1* | 8/2018 | Lecocq | G06T 15/506 |
| 2018/0238800 A1* | 8/2018 | Lecocq | G06T 15/506 |
| 2018/0239305 A1* | 8/2018 | Shi | G03H 1/0841 |
| 2018/0247393 A1* | 8/2018 | Ohga | G06T 5/006 |
| 2018/0262666 A1* | 9/2018 | Koga | H04N 5/2351 |
| 2018/0322628 A1* | 11/2018 | Schroecker | G06T 7/0012 |
| 2018/0336691 A1* | 11/2018 | Suzuki | G01B 21/045 |
| 2018/0374260 A1* | 12/2018 | Koylazov | G06T 15/506 |
| 2019/0005711 A1* | 1/2019 | Marin | G06K 9/627 |
| 2019/0050971 A1* | 2/2019 | Fukuda | H04N 1/46 |
| 2019/0080509 A1* | 3/2019 | Bianco | G06T 15/506 |
| 2019/0130630 A1* | 5/2019 | Ackerson | G06T 9/40 |
| 2019/0139295 A1* | 5/2019 | Nov K | G06T 15/55 |
| 2019/0258899 A1* | 8/2019 | Coogan | G06K 9/00657 |
| 2019/0287294 A1* | 9/2019 | Liu | G06T 15/60 |
| 2019/0304162 A1* | 10/2019 | Bakalash | G06T 15/005 |
| 2019/0304163 A1* | 10/2019 | Bakalash | G06T 1/60 |
| 2019/0325640 A1* | 10/2019 | Jiddi | G06T 17/00 |

OTHER PUBLICATIONS

Bikker, Infomagr—Advanced Graphics, http://www.cs.uu.nl/docs/vakken/magr/2016-2017/slides/lecture%2007%20-%20path%20tracing.pdf, Nov. 2016 (Year: 2016).*

Lewis, Making Shaders More Physically Plausible, University of British Columbia Department of Computer Science, Mar. 4, 1993 (Year: 1993).*

Lafortune et al., Using the Modified Phong Reflectance Model for Physically Based Rendering, Department of Computer Science, K.U. Leuven, Nov. 1994 (Year: 1994).*

Ashikhmin et al. , Distribution-based BRDFs, http://www.cs.utah.edu/~premoze/dbrdf/dBRDF.pdf, Mar. 2007 (Year: 2007).*

Siegel et al., Thermal Radiation Heat Transfer vol. III Radiation Transfer with Absording, Emitting, and Scattering media, Scientific and Technical Information Office,https://ntrs.nasa.gov/archive/nasa/casi.ntrs.nasa.gov/19710021465.pdf, 1971 (Year: 1971).*

Blinn, Models of Light Reflection for Computer Synthesized Pictures, University of Utah, Jul. 1977 (Year: 1977).*

Goral et al., Modeling the Interaction of Light Between Diffuse Surfaces, Cornell University, Jul. 1984 (Year: 1984).*

Beane, Chapter 19 Angular Momentum, Aug. 2010 (Year: 2010).*

Howell, Blackbody, Thermopedia, http://www.thermopedia.com/content/66/ , Aug. 2014 (Year: 2014).*

(56) References Cited

OTHER PUBLICATIONS

Vueghs et al., Presentation of the Hemisphere Method, Aerospace and Mechanical Engineering Department University of Liege, 2006, WIT press (Year: 2006).*
Howell et al., onLine Appendices to Thermal Radiation Heat Transfer, http://www.thermalradiation.net/webappendix/On-line%20appendices.pdf, Aug. 2015 (Year: 2015).*
Cohen et al. The Hemi-Cube : A Radiosity Solution for Complex Environments, Cornell University, Nov. 3, 1985 (Year: 1985).*
Han et al., Photometric Stereo for General BRDFs via Reflection Sparsity Modeling, Dec. 2015, IEEE (Year: 2015).*
Wang et al., Second-Order Feed-Forward Rendering for Specular and Glossy Reflections, Sep. 2014, IEE (Year: 2014).*
Arvo, J., "Analytic Methods for Simulated Light Transport", PhD Thesis, Yale University, Dec. 1995, pp. 1-232.
Arvo, J., "Applications of Irradiance Tensors to the Simulation of Non-Lambertian Phenomena", 1995 Special Interest Group on Graphics and Interactive Techniques (SIGGRAPH), Los Angeles, California, USA, Aug. 6, 1995, pp. 1-8.
Lewis, R., "Making shaders more physically plausible", 4th Eurographics Workshop on Rendering, Paris, France, Mar. 4, 1993, pp. 47-62.
Lafortune et al., "Using the modified phong reflectance model for physically based rendering", Technical Report CW197, Department of Computer Science, K. U. Leuven, Belgium, Netherlands, Nov. 1994, pp. 1-19.
Duvenhage et al., "Extending Backward Polygon Beam Tracing to Glossy Scattering Surfaces", Computer Graphics Forum, vol. 30, No. 6, Sep. 2011, pp. 1825-1836.
Kautz et al., "Approximation of Glossy Reflection with Prefiltered Environment Maps", Proceedings Graphics Interface, May 2000, pp. 119-126.
Lischinski et al., "Discontinuity Meshing for Accurate Radiosity", IEEE Computer Graphics & Applications, Nov. 1992, pp. 25-39.
Snyder, J., "Area light sources for real-time graphics", Technical report MSR-TR-96-11, Microsoft Corp., Mar. 6, 1996, pp. 1-32.
Green et al., "Efficient reflectance and visibility approximations for environment map rendering", Eurographics, vol. 26, No. 3, 2007, pp. 1-8.
Zaninetti et al., "An Adaptive Method for Area Light Sources and Daylight in Ray Tracing", Eurographics, vol. 18, No. 3, 1999, pp. 1-12.
Nishita et al., "Half-tone representation of 3-D objects illuminated by area sources or polyhedron sources", Proceedings of IEEE COMPSAC, Nov. 1983, pp. 237-241.

* cited by examiner

DEVICE AND METHOD FOR ESTIMATING A GLOSSY PART OF RADIATION

This application claims the benefit, under 35 U.S.C. § 119 of European Patent Application No. 15305229.5, filed Feb. 16, 2015.

1. TECHNICAL FIELD

The invention relates to the domain of image rendering in computer graphics, notably real-time rendering, regarding the glossy part of radiations coming from surfaces illuminated by area light sources. More particularly, it concerns glossy surfaces, whether in reflection or in transmission. The invention is relevant to GPU (Graphics Processing Unit) implementations for production rendering, lighting previsualisation (or previz) tools and video game engines.

2. BACKGROUND ART

Physically based shading with area light is a challenging topic in computer graphics. Namely, a point light source modeling for approximating the lighting has generally been exploited in CGI and video games, due to its mathematical simplicity. However, it suffers from severe limitations when located close to surfaces. Area lights provide more natural lighting, giving notably VFX (visual effects) and game creators finer control on light balancing within a scene, to reduce contrast or match some artistic criteria.

In what follows, the term "rendering" refers broadly to the conversion of geometry and material data into visual images.

Also, the word "glossy" generally refers to shininess, and can pertain to specular reflection as well as transmission. Typically, smooth surfaces appear shiny or glossy to the eye, due to a significant amount of light being focused around a privileged direction.

In this respect, a glossy surface in reflection is nearly-specular. Namely, while a perfectly smooth surface obeys Snell's law, which involves a unique reflection direction for any incoming ray (that direction being symmetric with respect to the incoming ray with respect to a normal to the illuminated surface), more realistic representations rely on reflected light distribution around that direction. The latter constitutes then merely a preferred direction for reflected light.

More generally, a radiation reflected by a surface is usually represented as comprising a glossy part, identified as a specular component, in addition to diffusion and/or ambient parts, respectively representative of an ambient lighting reflection and a diffuse reflection by the illuminated surface.

Similarly, a glossy surface in transmission (or a glossy part of a transmitted radiation) involves a light distribution around the Snell law direction of transmission—corresponding to transparency. A glossy object in transmission appears then typically as "frosted glass".

In what follows, a glossy radiation, or a glossy part of a radiation, designates a radiation concentrated around an oriented axis, whether in reflection or in transmission. In a more specific kind of glossy radiation, the behavior of the radiation around that axis is controlled by a cosine function raised by a n-power. The n power is then a glossiness or shininess constant coefficient that is worth at least 1, and is typically worth several tens or hundreds. The larger n, the more the glossy reflection is close to a perfect mirror-like specularity (smaller and sharper highlights), or the glossy transmission is close to a perfect transparency transmission. The cosine is further given by the angle between the oriented axis and a viewing direction.

Considering reflection, widespread models for the specular term are based on Phong lighting, which provides an empirical representation of local illumination of points on a surface, as well known to a person skilled in the art. Accordingly, the specular component of light reflected at a surface reflection point contains a factor derived from the dot product of a unit vector $\vec{r}$ corresponding to the mathematical reflection of the viewing direction over the surface at the considered reflection point, and of a unit vector $\vec{\omega}_i$ ("i" standing for incoming) pointing to the light source. That factor is then given by the dot product raised by an n-power, where n stands for a Phong exponent, which corresponds to the shininess constant above:

$$(\vec{\omega}_i \cdot \vec{r})^n,$$

Computing such an n-power factor proves generally computationally expensive, notably compared with the calculation of the diffuse and ambient terms. This is especially true with an area light source, because computations must be iterated over the surface of the light source.

Similar demanding computations are required for rendering an object that is glossy for light transmission, or for which part of the transmission is modelled as glossy.

As a whole, existing techniques for processing area light sources either require huge computation time to achieve good results or make some quality trade-off to work in real time.

In order to estimate the radiance of glossy surfaces illuminated by area lights (the radiance designating a light flux density per unit solid angle per unit area), two families of approaches have been developed: sampling ones and analytic ones.

The sampling approaches rely on discrete evaluation of the radiance integral either by considering discretization area light surface or by considering a stochastic sampling (typically Monte Carlo integration) of the hemisphere surrounding a receiving point. While those techniques work quite well with Lambertian surfaces, they require a huge amount of samples when dealing with non Lambertian surfaces, resulting in high computational costs.

Analytical approaches have been developed in particular by James Arvo, in his PhD thesis "Analytic methods for simulated light transport", Yale University, 1995, and in his article "Applications of Irradiance Tensors to the Simulation of Non-Lambertian Phenomena", In *Computer Graphics Proceedings, Annual Conference Series, ACM SIGGRAPH*, 1995. He introduced a closed form expression of radiance integral based on tensor theory and Stokes theorem, for polygonal light sources and Phong reflectance models. The surface integral is developed as a sum of 1D line integrals for which an analytic though complicated expression exists. Using integration by parts, a recurrence relation is derived, allowing incremental evaluation of the line integrals in $$o\left(\frac{n+2}{2}\right)$$

time.

The solution can be easily implemented in a GPU using any shading or computing language for real-time performances. However, for surface with high-order Phong exponents (e.g. greater than 100), the evaluation becomes computationally expensive. To overcome that issue, Arvo proposes early termination of the iteration loop once a desired relative accuracy is reached. Anyway, in many situations, the number of iterations is high for reaching performance hits during navigation. Moreover, execution of variable length on a GPU may result in poor performances due to code path divergence on parallel threads.

3. SUMMARY

The purpose of the present disclosure is to overcome for example at least one of the disadvantages of the background art, by for example offering a potentially efficient solution for estimating the radiance of glossy surfaces, or the radiance glossy part of non-Lambertian surfaces, illuminated by area lights.

An object of the disclosure is notably a real-time solution that, in its best embodiments, is able to provide outputs close to an exact solution with a quality similar to the ground truth, while requiring only O (1) time per area light edge in execution, instead of O (n) with traditional rendering methods.

Additional potential advantages of the present disclosure include easy implementation on graphics hardware, production renderers or games engines, and compatibility with soft shadow techniques based on shadow silhouette casting.

The present disclosure covers glossy reflection as well as glossy transmission, and is particularly relevant to polygonal light sources.

In this respect, the present disclosure relates to a device for determining a glossy part of a radiation coming from a surface illuminated by one or several area light source(s) having one or several source surface(s) bounded by edge curves. That device includes at least one processor configured for determining one or several integrand function(s) representative of the glossy part, that glossy part corresponding to an integration of the integrand function(s) along the edge curves.

According to the present disclosure, the processor(s) is/are further configured for:
  approximating the integrand function(s) by means of one or several peak-shape function(s) having a known antiderivative over the edge curves,
  computing the glossy part from analytical expressions associated with integrations of the peak-shape function(s) along the edge curves.

In particular implementations, the processor(s) is/are configured for estimating the glossy part when the latter is reflected by the illuminated surface.

That glossy part corresponds then advantageously to a specular term of a Phong reflection model.

In other implementations, the processor(s) is/are configured for estimating the glossy part when the latter is transmitted by the illuminated surface.

Advantageously, the processor(s) is/are configured for estimating the glossy part when the area light source(s) is/are polygonal and the edge curves are straight lines.

According to embodiments, the processor(s) is/are configured for estimating the glossy part coming from points of the illuminated surface, and the integrand function(s) depend(s) on the positioning of those points with respect to the edge curves and on viewing directions with regard to those points.

In particular implementations, the integrand function(s) having a maximal height at one or several peak abscissa(s) and having one or several floor value(s) at side abscissas, the processor(s) is/are configured for approximating the integrand function(s) by using parameters representative of those maximal height, peak abscissa(s), floor value(s) and side abscissas.

Also, the integrand function(s) having a maximal height and reaching a predefined ratio of that maximal height at one or several width abscissa(s), the processor(s) is/are advantageously configured for approximating the integrand function(s) by using parameters representative of those maximal height and width abscissa(s).

Then, the peak-shape function(s) being parameterized with one or several adjustment parameter(s), the processor(s) is/are preferably configured for determining the adjustment parameter(s) by using the parameters representative of the maximal height and width abscissa(s).

In specific implementations, the processor(s) is/are configured for approximating the integrand function(s) by using a linear combination of the peak-shape function(s) in an untranslated form, in a rightward translated form, and in a leftward translated form.

In other specific implementations, the peak-shape function(s) comprise(s) at least one of a Lorentzian function and a Pearson function.

Then, advantageously, the peak-shape function(s) comprise(s) an affine combination of a Lorentzian function and a Pearson function, and the integrand function(s) having a tail value at one or several tail abscissa(s), the processor(s) is/are configured for determining that affine combination by using parameters representative of those tail value and tail abscissa(s).

Advantageously, the device for estimating a glossy part of a radiation comprises a programmable rendering pipeline adapted for computing the glossy part.

In addition, the device comprises advantageously parallel computing capabilities, adapted to operations of the processor(s) in estimating the glossy part.

Another object of the invention is a GPU comprising a device for estimating a glossy part compliant with the present disclosure.

The present disclosure also pertains to a method for estimating a glossy part of a radiation coming from a surface illuminated by one or several area light source(s) having at least one source surface bounded by edge curves. That method includes determining one or several integrand function(s) representative of the glossy part, the latter corresponding to an integration of the integrand function(s) along the edge curves.

According to the present disclosure, the method further comprises:
  approximating the integrand function(s) by means of one or several peak-shape function(s) having a known antiderivative over the edge curves,
  computing the glossy part from analytical expressions associated with integrations of the peak-shape function(s) along the edge curves.

That method is advantageously executed by means of a device for estimating a glossy part according to the present disclosure.

In addition, the present disclosure concerns a computer program for estimating a glossy part of a radiation, comprising software code adapted to compute shadow according to perform steps of a method compliant with the present disclosure.

The present disclosure further pertains to a non-transitory program storage device, readable by a computer, tangibly embodying a program of instructions executable by the computer to perform a method for estimating a glossy part of a radiation compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM (read-only memory), an EPROM (Erasable Programmable ROM) or a Flash memory, a portable CD-ROM (Compact-Disc ROM).

4. LIST OF FIGURES

The present disclosure will be better understood, and other specific features and advantages will emerge upon reading the following description of particular and non-restrictive illustrative embodiments, the description making reference to the annexed drawings wherein.

Figure 1:
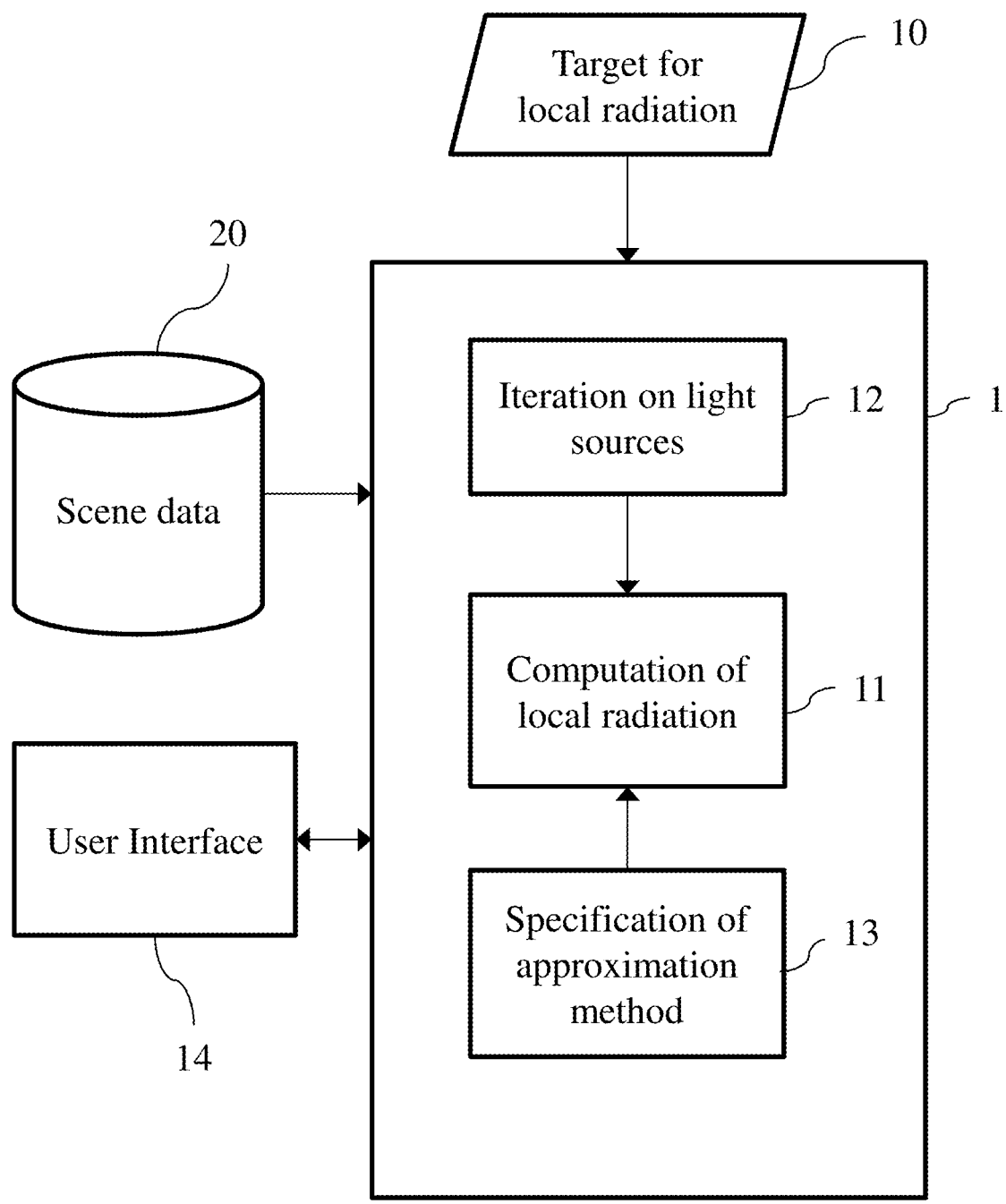
FIG. 1 is a block diagram representing schematically a device for estimating a glossy part of a radiation, compliant with the present disclosure.
Figure 10:
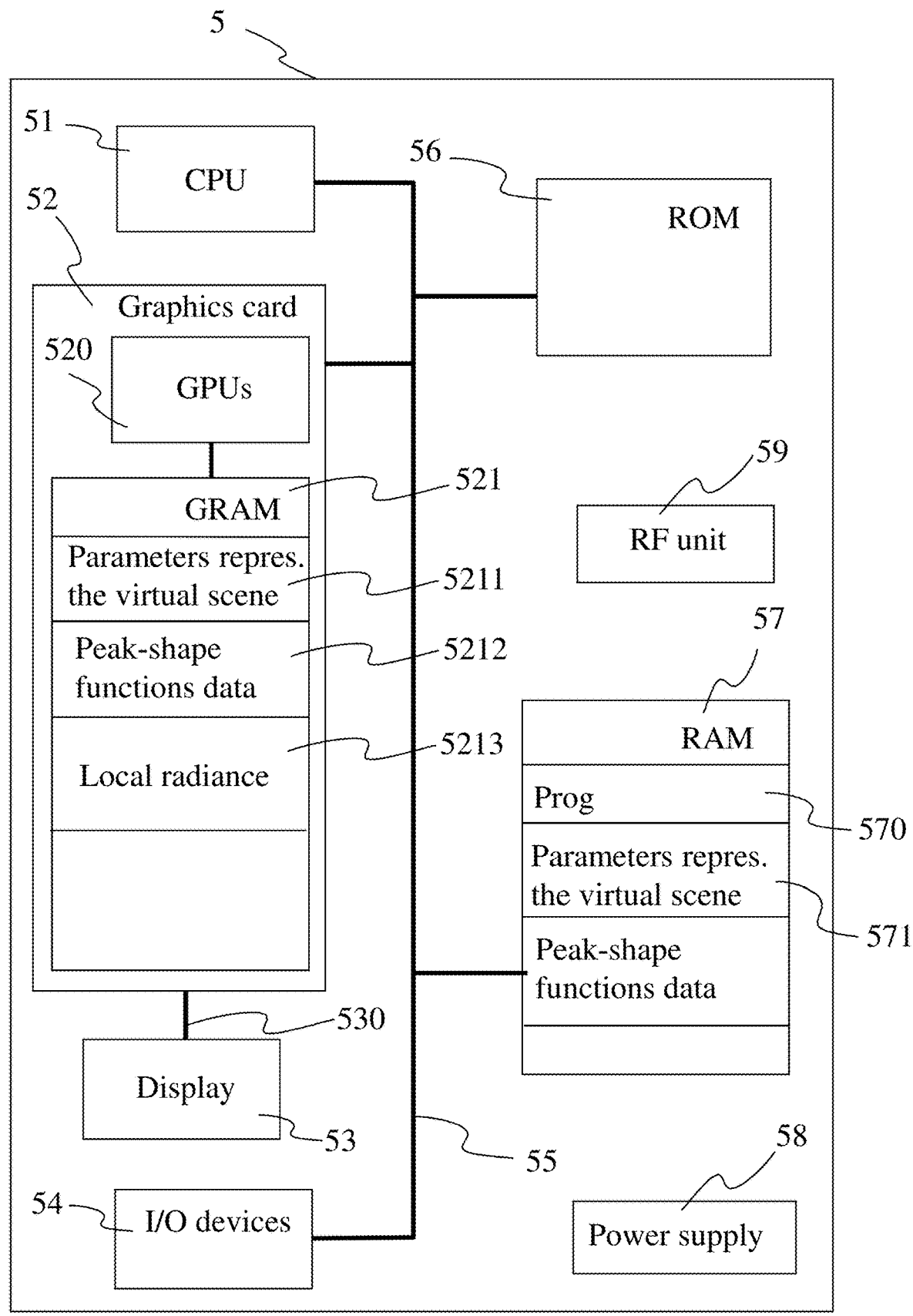

FIG. 10 diagrammatically shows a graphics processing apparatus comprising the device represented on FIG. 1.

5. DETAILED DESCRIPTION OF EMBODIMENTS

The present disclosure will be described in reference to a particular functional embodiment of device 1 for determining, e.g. computing or estimating, a glossy part of a radiation due at least partly to one or several area lights, as illustrated on FIG. 1.

The terms "adapted" and "configured" are used in the present disclosure as broadly encompassing initial configuration, later adaptation or complementation of the present device, or any combination thereof alike, whether effected through material or software means (including firmware).

The device 1 is adapted for processing such a glossy part in reflection (which concerns a specular component), in transmission, or in both reflection and transmission. It is particularly appropriate for glossy surfaces (in reflection and/or in transmission), but can also be relevant to various kinds of surfaces. In the general situation in reflection, the radiation including typically an ambient component, a diffusion component and a specular component, the device 1 is directed at least to the latter.

Also, the device 1 is configured for estimating the glossy part of a radiation at a specific surface point and directed to a specific view direction. The pieces of information comprising those point and direction form a target 10 for local radiation. In preferred embodiments, the device 1 is adapted to determine a radiance at the considered point in the considered direction (which consists in a light flux density per unit solid angle per unit area), for a quantity of radiance being either emitted from the considered surface or passing through it. In particular implementations, the device 1 is also adapted to determine a spectral radiance (radiance per frequency or wavelength).

Anyway, in a preferred version, the device 1 is also configured for processing multiple surface points and view directions, advantageously at least in part in parallel. Particular embodiments include GPU rendering systems, adapted to evaluate the radiance of glossy surfaces illuminated by area lights. More specifically, the device 1 is then advantageously implemented in a programmable rendering pipeline, either in a fragment shader (in charge of processing fragments generated by a rasterizer) or alternatively in a computing kernel involving any language with GPU parallel computing capabilities, such as notably Compute Shader, CUDA (Compute Unified Device Architecture) or OpenCL (Open Computing Language). Particular embodiments include production renderers and games engines. The device 1 is further advantageously exploited for real-time rendering and/or with soft shadow techniques based on shadow silhouette casting.

In addition, in specific implementations, the device 1 is adapted for computing a luminance (luminous intensity per unit area of light traveling in a particular direction, which takes into account a luminosity function pertaining to the sensitivity of a human eye to different wavelengths).

The device 1 is advantageously an apparatus, or a physical part of an apparatus, designed, configured and/or adapted for performing the mentioned functions and produce the mentioned effects or results. In alternative implementations, the device 1 is embodied as a set of apparatus or physical parts of apparatus, whether grouped in a same machine or in different, possibly remote, machines.

In all what follows, the modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the device 1.

The device 1 comprises a core module 11 in charge of computing local radiation, which corresponds to a glossy part of a radiation emitted at the considered point towards the considered direction. It further includes a module 12 for iteration on light sources, enabling the module 11 to combine the effects of several light sources illuminating the considered surface. The device 1 is adapted to process the relevant light sources so that at least one of them is an area light source.

In addition, a module 13 is directed to specifying the approximation method(s) exploited in estimating the glossy part of the radiation. Those approximation methods prove determining in computing the glossy part in a potentially efficient and accurate way, as will be developed below. Some features of those methods are advantageously pre-recorded in the device 1 or in a related storage means (not represented), the module 13 being in charge of retrieving the appropriate corresponding information. In particular, default selections are preferably available to users.

Also, the module 13 allows preferably the user to enter information on the selected approximation methods, via a user interface 14 interacting with the device 1. That information can include notably appropriate parameters and/or types of approximation functions.

The user interface 14 includes any means appropriate for entering or retrieving data, information or instructions, notably visual, tactile and/or audio capacities that can encompass any or several of the following means as well known by a person skilled in the art: a screen, a keyboard, a trackball, a touchpad, a touchscreen, a loudspeaker, a voice recognition system.

The device 1 is adapted to be fed with scene data from storage resources 20. Alternatively or complementarily, the device 1 is configured for receiving scene data from other devices or parts of devices, advantageously in real time. Those scene data include information on geometry (e.g. objects and light sources shapes, sizes and positions in a 3D scene, including with respect to viewpoints, depth maps and/or shadow maps), on light properties of materials (e.g. translucent objects, specular or diffusion surfaces, reflectance values, kinds of light behaviour representations) and on lighting conditions (e.g. kinds of light sources, considered as punctual or as area sources, lighting intensities). The device 1 is preferably configured for being able to process such data when the latter vary dynamically in time.

The storage resources 20 can be available from any kind of appropriate storage means, which can be notably a RAM (Random Access Memory) or an EEPROM (Electrically-Erasable Programmable Read-Only Memory) such as a Flash memory, possibly within an SSD (Solid-State Disk).

Figure 2:
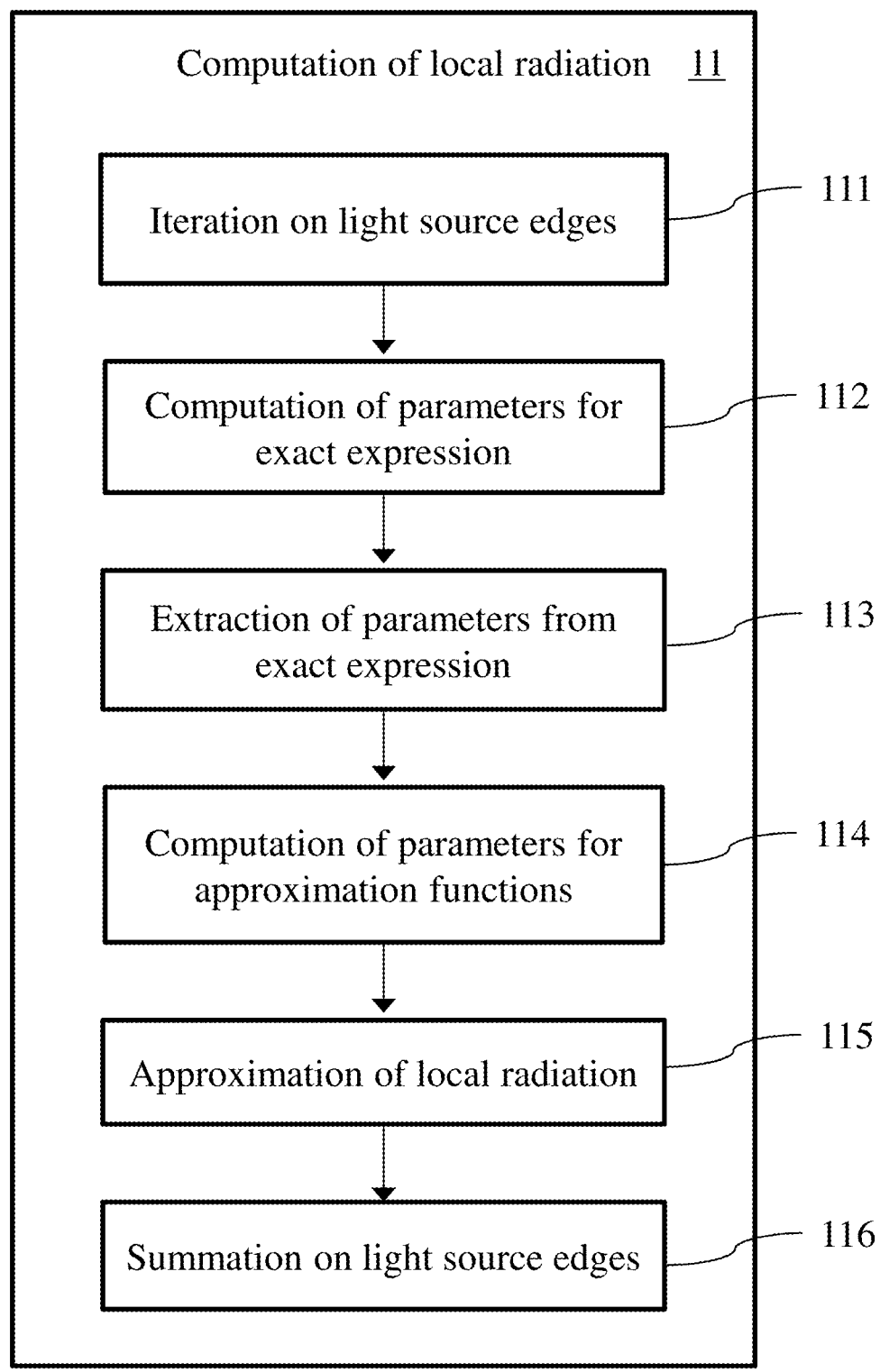
FIG. 2 is more detailed block diagram representation of a computation module of the device shown on FIG. 1.

As illustrated on FIG. 2, the module 11 dedicated to computing local radiation comprises itself several modules including:
- a module 111 for iterating computations on light source edges for the considered light source specified from the iteration module 12;
- a module 112 for computing parameters appropriate to determine an exact expression corresponding to a targeted measure of the considered glossy part of radiation;
- a module 113 for extracting parameters from the exact expression obtained from the module 112;
- a module 114 for computing parameters dedicated to approximation functions;
- a module 115 for computing an approximation of the local radiation, based on the parameters obtained from the upstream modules 112 to 114;
- a module 116 for summing the computed contribution to the local radiation, both with respect to the light source edges iterated by means of module 111 and to the light sources iterated by module 12.

The operations of the device 1 will be made clearer through specific description below of particularly attractive implementations, applied to light reflection.

Figure 3:
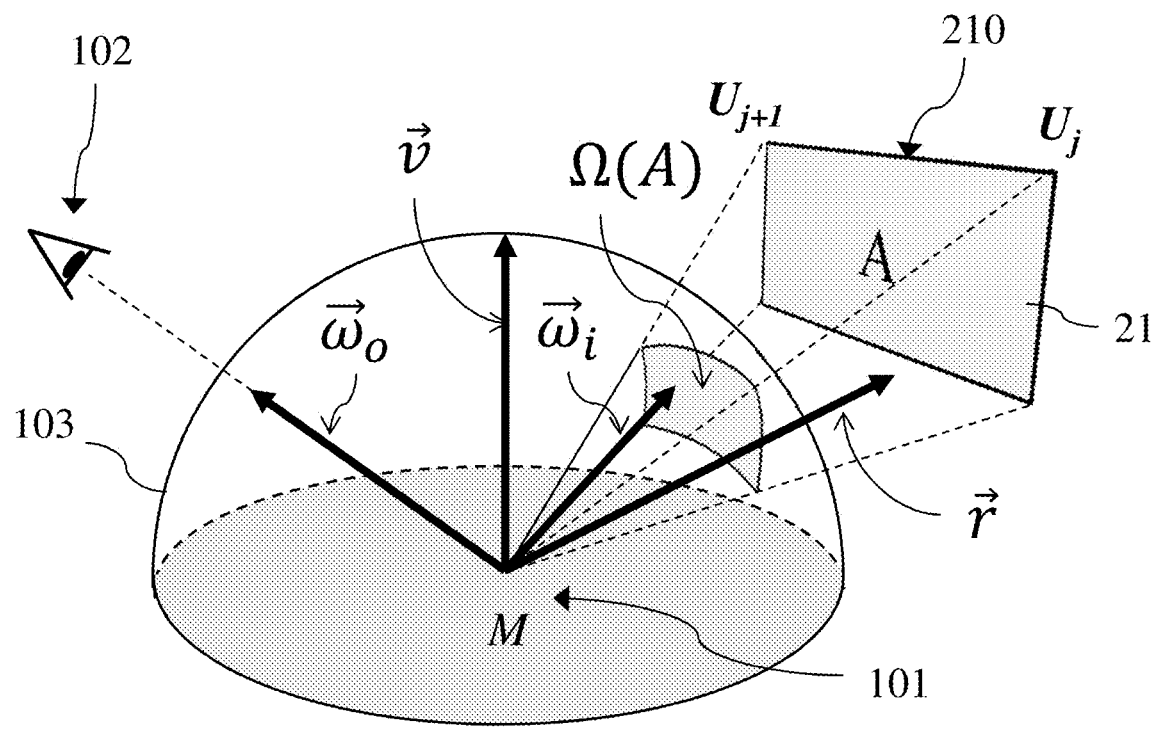
FIG. 3 illustrates a physical configuration of a surface, where a reflective glossy part of a radiation (specular component) can be estimated by means of a device such as the one illustrated on FIGS. 1 and 2.

The physical situation and its representation are clarified on FIG. 3 for a particular surface point 101 noted M lying on an object lighted by an area light source 21 having a light source surface A. That object has a surface at point M which is normal to a unit vector $\vec{v}$. The considered point M may notably correspond to a fragment processed in a rendering pipeline.

The source surface A is bounded by edges 210 forming a polygonal shape—a rectangle on the represented example. Though the device 1 could be applied to various shapes of light source surfaces, a representation by such a polygonal shape is preferred and possibly leads to particularly efficient and reliable computations in best implementations.

The directions from the light source 21 to the point M are given by an opposite unit vector $\vec{\omega}_i$ ("i" for "incoming"), running towards the source surface A. Also, a unit hemisphere 103 is defined around point M and normal vector $\vec{\sigma}$. The source surface A is projected onto that hemisphere 103 into a spherical projection associated with a solid angle $\Omega(A)$—since surface A is a polygon, its spherical projection is a spherical polygon, the edges of which are great arcs (i.e. segments of great circles). Radiance of the light source 21 at point M (from light surface A) from direction $\vec{\omega}_i$ is noted $L_A(M, \vec{\omega}_i)$.

A viewing direction towards an observer 102 is defined through a unit vector $\vec{\omega}_o$ ("o" for "outgoing"). Therefrom, a unit vector $\vec{r}$ is considered, which represents the reflection of the viewing direction $\vec{\omega}_o$ against a tangent plane corresponding to the surface at point M. Namely, vector $\vec{r}$ is derived from vector $\vec{\omega}_o$ by an application of the Householder matrix $[I - 2\vec{v}\vec{v}^T]$, where I is the identity matrix and "T" designates a transposition.

The reflectance properties of the lightened surface at point M, depending on the surface material, are represented by a BRDF function (bidirectional reflection distribution function) noted $f_r(M, \vec{\omega}_i, \vec{\omega}_o)$. As well known to a person skilled in the art, a BRDF function relates radiance incident at a point on a surface to radiance reflected from that point. The radiance $L(M, \vec{\omega}_o)$ scattered at point M towards observer 102 (color perceived by the eye) is then defined by a hemispherical integral over the solid angle $\Omega(A)$ sustained by the light source surface A:

$$L(M,\vec{\omega}_o) = \int_{\Omega(A)} L_A(M,\vec{\omega}_i) f_r(M,\vec{\omega}_i,\vec{\omega}_o)(\vec{\omega}_i \cdot \vec{v}) d\omega_i \quad (1)$$

where $d\omega_i$ represents a differential variation of the solid angle.

In the present examples and for sake of illustration, the BRDF function is given by a Phong distribution model, which provides a common way of representation. As familiar to a skilled person, the radiance is then split up into an ambient component, which accounts for incident light not coming directly from a light source, a diffuse component and a specular component. That local shading model can be replaced by a more sophisticated one, in which the ambient term is turned to a component taking interactions between objects into consideration (global shading model).

In the following, only the specular component will be considered, since it is relevant to the glossy (or specular) part of the radiation reflected by the surface. In particular situations, the considered surface is itself glossy (or nearly specular), so that the radiation is identified with its glossy part for the computations. The glossy component of the representation accounts for the fact that the considered surface is not perfectly smooth, so that reflection of light does not obey Snell's law. Instead, the related reflected light has a distribution about a preferred direction of specularly reflected light. The concentration of that distribution is expressed by the shininess coefficient n, also called Phong or specular-reflection exponent, controlling the glossiness.

By noting $\rho_s$ a specular reflectivity, which provides a ratio of reflection of the specular term of incoming light, and supposing that this term is constant at point M (at least for a given color channel) as usually done in the Phong model, two representations are notably relevant to the glossy part:

$$f_{r1}(M, \vec{\omega_i}, \vec{\omega_o}) = \rho_s(M) \frac{n+1}{2\pi} \frac{(\vec{\omega_i} \cdot \vec{r})^n}{(\vec{\omega_i} \cdot \vec{v})} \quad (2)$$

$$f_{r2}(M, \vec{\omega_i}, \vec{\omega_o}) = \rho_s(M) \frac{n+2}{2\pi} (\vec{\omega_i} \cdot \vec{r})^n \quad (3)$$

The first of those representations, corresponding to equation (2), is relevant to a one-axis moment Phong distribution model and is described notably by Robert R. Lewis in "Making shaders more physically plausible", in *Fourth Eurographics Workshop on Rendering*, pp. 47-62, 1994. The second representation, associated with equation (3), is relevant to a double-axis moment and is described notably by Eric P. Lafortune and Yves D. Willems in "Using the modified Phong reflectance model for physically based rendering", Technical Report RP-CW-197, 1994.

In the following, the first representation (equation (2)) will be adopted for developments, though in particular embodiments, the device 1 is also or instead configured for the second representation (equation (3)).

More generally, in variant implementations, the device 1 is also (or instead) adapted to other BRDF representations of the specular component than Phong distribution models. This applies particularly to a radiation having a distribution behavior around an oriented axis, which is controlled by a cosine function raised by a shininess coefficient n, the cosine being given by the angle between the oriented axis and a viewing direction.

Figure 4:
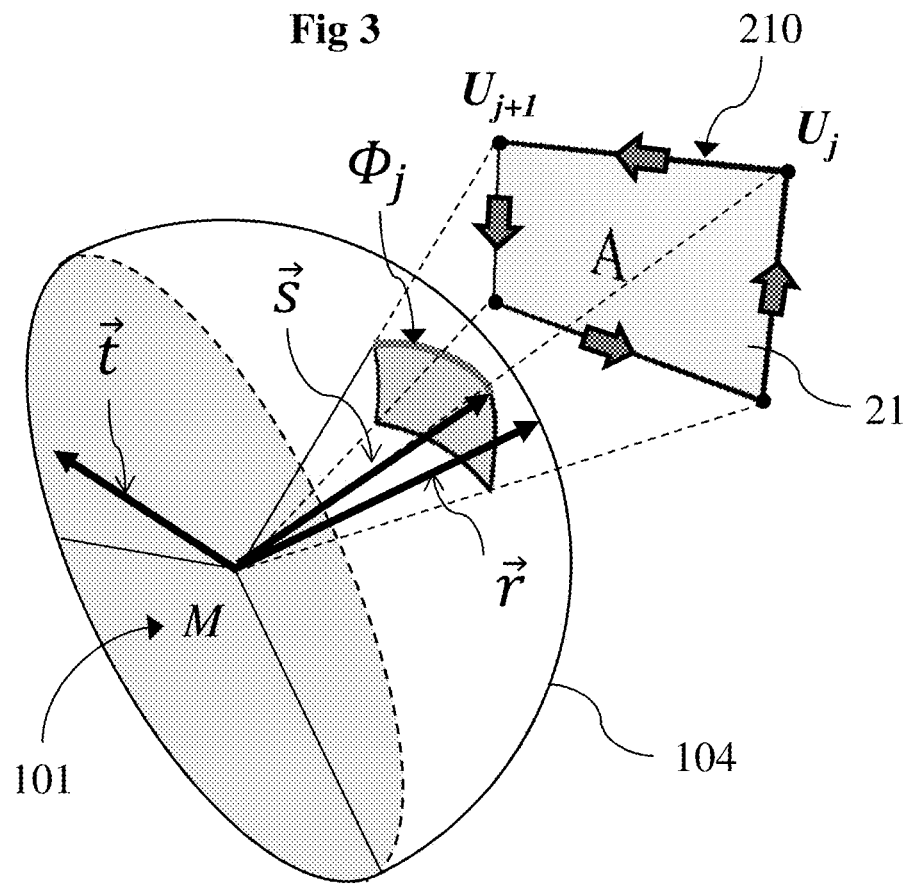
FIG. 4 shows the physical configuration of FIG. 3, with mathematical entities exploited in the device of FIGS. 1 and 2.

The functionalities and working of device 1 are made clearer through the mathematical considerations below, given in relation with FIGS. 3 and 4. Namely, the light source surface A being polygonal and having m edges 210, the 2D surface integral of equation (1) can be expressed as a summation of a 1D contour integral around the edges 210. This is based on the Stokes theorem and on the developments by Arvo in the above-cited PhD thesis and article.

Accordingly, for each of the oriented m edges 210, such as $U_jU_{j+1}$, a unit vector $\vec{s}$ can be defined, pointing from point M to a first vertex $U_j$ of edge $U_jU_{j+1}$, as well as a unit vector $\vec{t}$, orthogonal to vector $\vec{s}$ and in the plane of the edge $U_jU_{j+1}$, so that $(\vec{s}, \vec{t})$ constitutes an orthonormal basis. This is used for defining for edge $U_jU_{j+1}$, the parameters (keeping in mind that $\vec{s}$ and $\vec{t}$ depend on the considered edge 210):

$$a_j = \vec{r} \cdot \vec{s}, \; b_j = \vec{r} \cdot \vec{t}, \; c_j = \sqrt{a_j^2 + b_j^2}, \; \delta_j = \arctan\left(\frac{b_j}{a_j}\right) \quad (4)$$

Further, an edge aperture $\Phi_j$ is defined as the angle opening corresponding to edge $U_jU_{j+1}$, as projected onto a hemisphere 104 around point M and direction $\vec{r}$. Also, unit normal vectors $\vec{n_j}$ are defined as normal and external to the boundary of source surface A, i.e. to the edges 210, and tangent to the hemisphere 104.

The module 111 is responsible for the iteration on the edges 210, while module 112 is in charge of computing parameters $a_j$, $b_j$, $c_j$ and $\delta_j$ from formulae (4).

Following Arvo's developments cited above, the radiance $L_A(M, \vec{\omega_i})$ of the light source 21 at point M being represented as independent of direction $\vec{\omega_i}$ (and noted $L_A(M)$ for sake of convenience)—which amounts to considering it as constant over the light source, the radiance $L(M, \vec{\omega_o})$ is given for the first BRDF Phong representation associated with equation (2) by:

$$L(M, \vec{\omega_o}) = \quad (5)$$
$$\frac{\rho_s(M) L_A(M)}{2\pi} \begin{cases} \sum_{j=1}^{m} (\vec{n_j} \cdot \vec{r}) F(\Phi_j, a_j, b_j, n-1) & \text{if } n \text{ odd} \\ \Omega(A) + \sum_{j=1}^{m} (\vec{n_j} \cdot \vec{r}) F(\Phi_j, a_j, b_j, n-1) & \text{if } n \text{ even} \end{cases}$$

with:

$$F(x, a, b, n) = \begin{cases} \sum_{k=0}^{\frac{n-1}{2}} \int_0^x (a\cos\varphi + b\sin\varphi)^{2k+1} d\varphi & \text{if } n \text{ odd} \\ \sum_{k=0}^{\frac{n}{2}} \int_0^x (a\cos\varphi + b\sin\varphi)^{2k} d\varphi & \text{if } n \text{ even} \end{cases} \quad (6)$$

Following the harmonic addition theorem, the trigonometric expressions can be simplified as:

$$a \cos \varphi + b \sin \varphi = c \cos(\varphi - \delta) \quad (7)$$

giving:

$$F(x, a, b, n) = G(x, c, \delta, n) \quad (8)$$

$$G(x, c, \delta, n) = \begin{cases} \sum_{k=0}^{\frac{n-1}{2}} \int_0^x c^{2k+1} (\cos(\phi - \delta))^{2k+1} d\phi & \text{if } n \text{ odd} \\ \sum_{k=0}^{\frac{n}{2}} \int_0^x c^{2k} (\cos(\phi - \delta))^{2k} d\phi & \text{if } n \text{ even} \end{cases}$$

For sake of conciseness, a function f ($\phi$, c, n) and a parameter q are introduced so that:

$$f(\phi, c, n) = \begin{cases} c\cos\phi & \text{if } n \text{ odd} \\ 1.0 & \text{if } n \text{ even} \end{cases} \quad (9)$$

$$q = \begin{cases} \frac{n-1}{2} & \text{if } n \text{ odd} \\ \frac{n}{2} & \text{if } n \text{ even} \end{cases}$$

Noting that the sum operator and integral can be inverted in formulae (8), and that geometric series are thereby obtained, the function G is worth:

$$G(x, c, \delta, n) = \int_0^x f(\phi - \delta, c, n) \frac{(c\cos(\phi - \delta))^{2q+2} - 1}{(c\cos(\phi - \delta))^2 - 1} d\varphi$$

By moving δ in the integration range, function G can thus be written:

$$G(x,c,\delta,n) = \int_{-\delta}^{x-\delta} I(\varphi,c,n) d\phi \quad (10)$$

with the integrand:

$$I(\phi, c, n) = \frac{(c\cos\phi)^{n+2} - f(\phi, c, n)}{(c\cos\phi)^2 - 1} \quad (11)$$

The integrand function I is approximated as described below, thanks to dedicated peak-shape functions having known antiderivatives. In best implementations, integrand I can thereby be evaluated with high accuracy and subject to few parameterization operations.

Figure 5A:
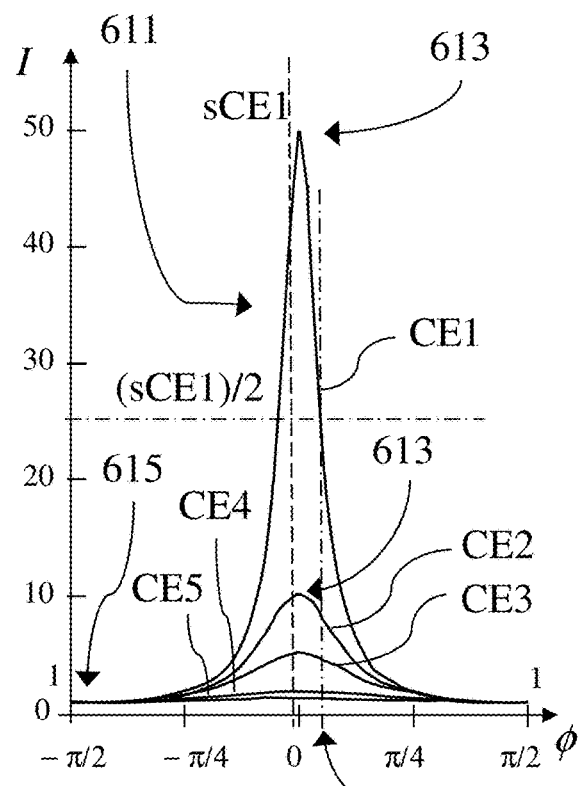
FIGS. 5A and 5B represent plots giving an integrand function of an angle corresponding to the physical configuration of FIGS. 3 and 4, for various values of parameters representative of surface shininess and of respective positions of view direction and light source; they correspond respectively to even and odd values of the shininess parameter.
Figure 5B:
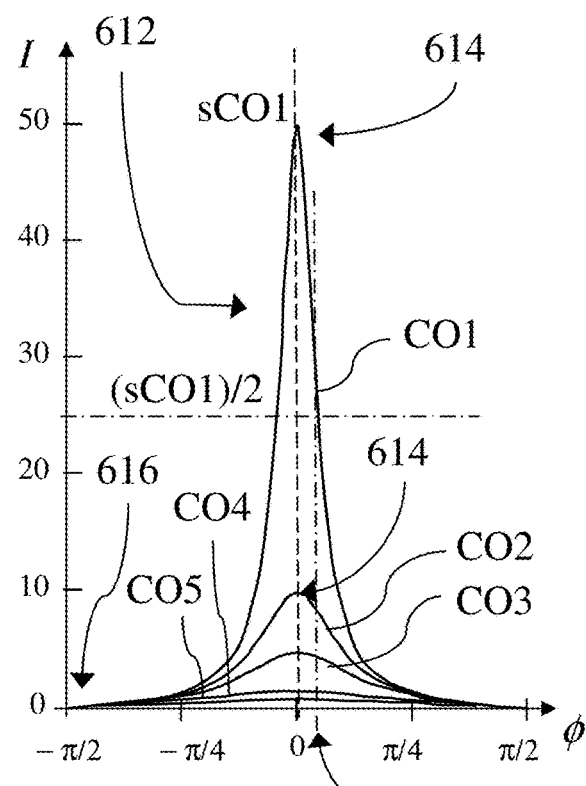

That function is represented on FIGS. 5A and 5B for different values of parameters c and n, curves 611 on FIG. 5A and curves 612 on FIG. 5B corresponding respectively to even and odd values of Phong exponent n. More precisely, for n even (FIG. 5A), the curves 611 noted CE1, CE2, CE3, CE4 and CE5 are respectively associated with the following values of parameters c and n:

(0.99; 500), (0.95; 200), (0.9; 50), (0.7; 100), (0.5; 500)

Likewise, for n odd (FIG. 5B), the curves 612, noted CO1 to CO5, are respectively associated with the following values of parameters c and n:

(0.99; 501), (0.95; 201), (0.9; 51), (0.7; 101), (0.5; 501)

As apparent on the figures, the curves 611 and 612 have a peak shape with upper values 613 (for even n) and 614 (for odd n). For example, the upper value 613 for curve CE1 is sCE1, while the upper value 614 for curve CO1 is sCO1. Also, they have a lower value 615 equal to 1 for even n, and a lower value 616 equal to 0 for odd n, those minimum levels being reached for φ being equal to ±π/2. Therefore, the integrand function I corresponds to peak functions with variable scale and width depending on parameters c and n.

A new parameter is computed on this ground, by the module 113 of device 1: the maximum of the function, reached at φ=0 and noted s.

Parameter s is given by:

$$s = \begin{cases} \frac{c^{n+2} - c}{c^2 - 1} & \text{if } n \text{ odd} \\ \frac{c^{n+2} - 1}{c^2 - 1} & \text{if } n \text{ even} \end{cases} \quad (12)$$

Figure 6A:
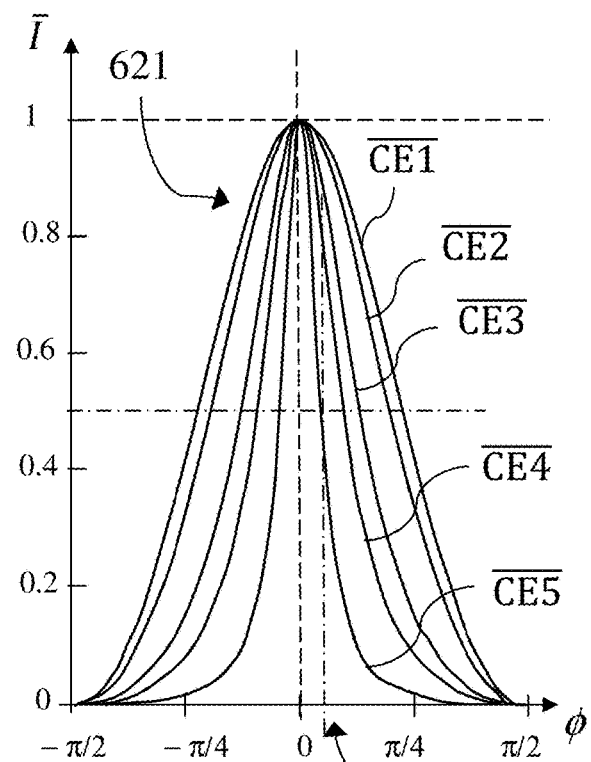
FIGS. 6A and 6B represent plots giving the integrand function of respectively FIGS. 5A and 5B once normalized, and once shifted for the even values of FIG. 5B.
Figure 6B:
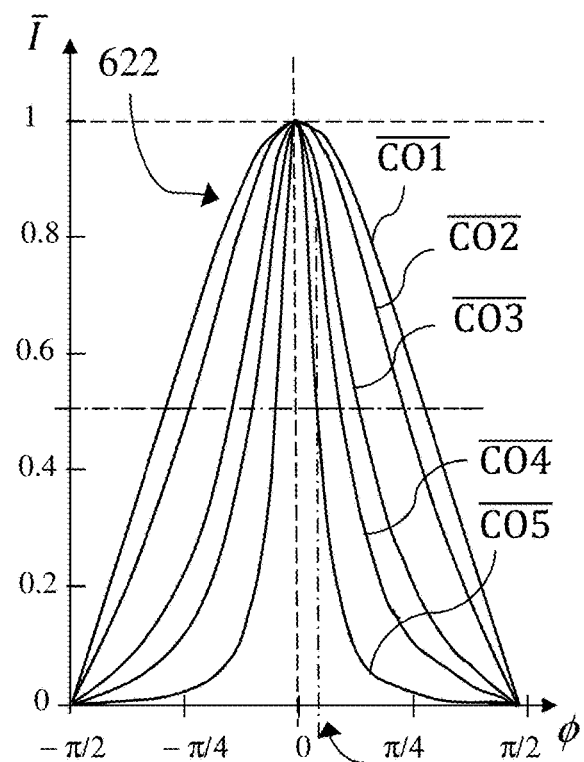

From the knowledge of s, normalized functions noted $\tilde{I}$ can be induced from the integrand function I, ranging between 0 and 1, as illustrated on FIGS. 6A and 6B. Those are obtained by preliminarily shifting down the integrand function I for even n, and by dividing it by parameter s (scaling) for even and odd values of n. Thereby, curves 621 and 622 are respectively obtained for even n (FIG. 6A) and odd n (FIG. 6B), with curves 621 noted $\overline{CE1}$ to $\overline{CE5}$ corresponding respectively to curves CE1 to CE5, and curves 622 noted $\overline{CO1}$ to $\overline{CO5}$ corresponding respectively to curves CO1 to CO5.

Another additional parameter computed by the module 113 is the half-width $x_\omega$, for which the integrand function I is worth half of its maximum value s. The values of half-width $x_\omega$, for even n (FIG. 5A) and odd n (FIG. 5B), are given by the positive value of φ for which the integrand function I is worth half its maximum value s.

The equation I (φ,c,n)=s/2 having no analytical solution, the value of parameter $x_\omega$ is approximated in the present exemplary implementation by formulae giving approximating values $\widetilde{x_\omega}$ as follows:

$$\widetilde{x_\omega}(c, n) = \begin{cases} \frac{\pi}{3}\sqrt{1 - \left(c - \frac{c}{n}\right)^2} & \text{if } n \text{ odd} \\ \frac{\pi}{4}\left(1 - \left(c - \frac{c}{n-1}\right)^{2.5}\right)^{0.45} & \text{if } n \text{ even} \end{cases} \quad (13)$$

The relevance of that approximation proves to rely on the ellipse shape of the half width parameter $x_\omega$ when n tends to infinity, with $x_\omega$ converging to respectively π/3 and π/4 for n odd and even when c tends to 0, and $x_\omega$ converging to 0 when c tends to 1 and n to infinity.

Figure 7A:
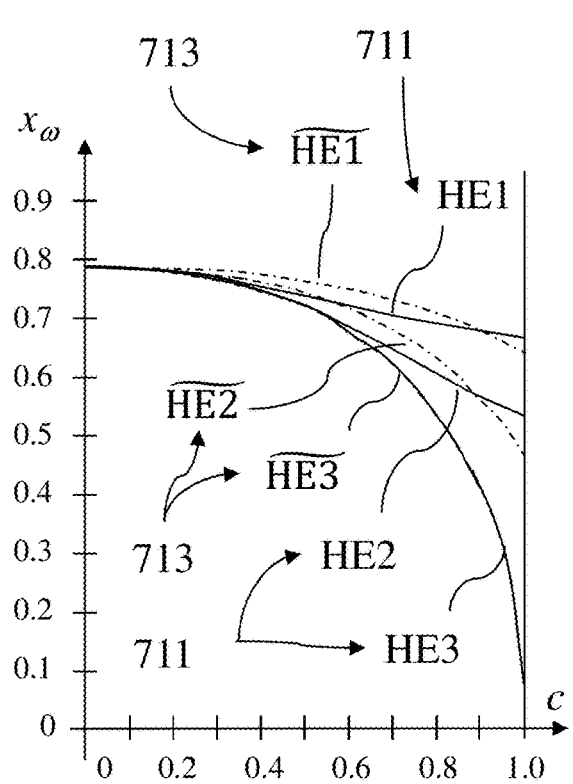
FIGS. 7A and 7B represent plots showing the variation of a half-width abscissa, and of a related approximation used by the device of FIG. 1, for respectively FIGS. 5A and 5B, in function of the parameter representative of respective positions of view direction and light source.
Figure 7B:
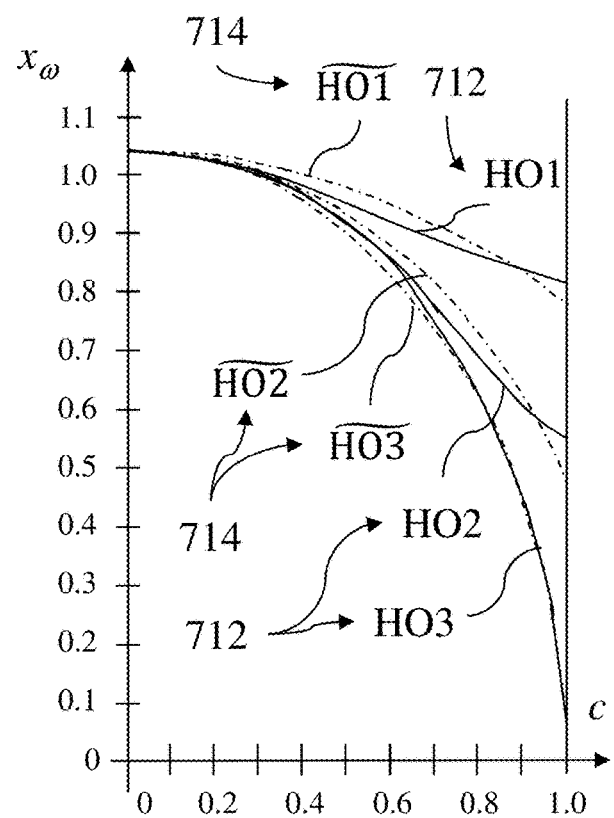

As illustrated on FIGS. 7A and 7B, showing curves 711 and 712 that give parameters $x_\omega$ in function of parameter c for respectively n even and odd, the approximated values $\widetilde{x_\omega}$ prove relatively satisfying. More precisely, considering the curves 711 noted HE1, HE2 and HE3 associated respectively with values 4, 8 and 500 of parameter n for $x_\omega$, corresponding respective curves 713 noted $\widetilde{HE1}$, $\widetilde{HE2}$ and $\widetilde{HE3}$ are represented (dashed lines) for the approximated values $\widetilde{x_\omega}$. Similarly, for the curves 712 noted HO1, HO2 and HO3 associated respectively with values 3, 9 and 501 of parameter n, corresponding curves 714 noted $\widetilde{HO1}$, $\widetilde{HO2}$ and $\widetilde{HO3}$ are represented for the approximated values $\widetilde{x_\omega}$. As visible on FIGS. 7A and 7B, the approximation is quite accurate for high values of n exponent and average for low values.

Advantageously, however, a low precision estimation is considered as sufficient for the latter, while a high level of accuracy is applied for the former. Indeed, for low values of n, smooth peak curves with large width are obtained, so that small variations of $x_\omega$ correspond to small variations of integrand function I. By contrast, for high values of n, the slope becomes very high and a small variation of $x_\omega$ can possibly correspond to a huge variation of integrand function I.

Those computed parameters c, s and $x_\omega$ are used for specifying appropriate peak-shape functions, which are exploited for constructing an approximation $\tilde{I}(\phi,c,n)$ of the integrand function I(φ,c,n) as explained hereinafter. The peak-shape functions, which like I have dependencies on φ, c and n, are in a generic way noted P (φ,c,n).

The peak-shape functions are determined through the combination of an upstream selection of the approximation method by the specification module 13 (including the kind of functions, possibly some key parameters and the way of exploiting them), and through computations by the computation module 114 of current parameters that depend on the specific configuration situation (geometry, light behavior of lightened surfaces, positioning of the considered point with respect to the considered area source lights, viewing direction . . . ).

Two families of implementations with peak-shape functions are described below for sake of illustration: a sophisticated one and a simpler one. The choice between both relies on a trade-off between computation costs and estimation accuracy. Preferably, the device 1 is adapted to execute any of them, depending on user choices. In what follows, the considered functions are symmetric.

For the sophisticated implementations, a triple peak-shape function Q ($\phi$,c,n) is derived from a single normalized peak-shape function P ($\phi$,c,n) so as to be used in the approximations. That triple peak-shape function Q ($\phi$,c,n) is obtained by constructing a linear function of the same peak-shape function P ($\phi$,c,n) taken as such, $\pi$-downward translated to P ($\phi$+$\pi$,c,n) and $\pi$-upwards translated to P ($\phi$−$\pi$,c,n), the considered angle interval remaining bounded by −$\pi$/2 and $\pi$/2 (though the domain of definition is broader, and possibly unbounded). Rather surprisingly, a particularly efficient approximation function is thereby made available.

More precisely, a particularly efficient combination is determined by considering the following triple peak-shape function Q ($\phi$,c,n):

$$Q(\phi, c, n) = \begin{cases} P(\phi, c, n) - P(\phi - \pi, c, n) - P(\phi + \pi, c, n) & \text{if } n \text{ odd} \\ P(\phi, c, n) + P(\phi - \pi, c, n) + P(\phi + \pi, c, n) & \text{if } n \text{ even} \end{cases} \quad (14)$$

The approximated integrand function $\tilde{I}(\phi,c,n)$ is then obtained from Q by the computations of a translation factor vShift(c,n) and a scaling factor sNorm(c,n)—together with an intermediary factor d(c,n). They are determined from the following formulae by the computation module 114, omitting c and n dependencies in the functions arguments for sake of conciseness:

$$vShift = \begin{cases} -P\left(\frac{3\pi}{2}\right) & \text{if } n \text{ odd} \\ P\left(\frac{3\pi}{2}\right) + 2P\left(\frac{\pi}{2}\right) & \text{if } n \text{ even} \end{cases} \quad (15)$$

$$d = \begin{cases} 1 - 2P(\pi) - vShift & \text{if } n \text{ odd} \\ 1 + 2P(\pi) - vShift & \text{if } n \text{ even} \end{cases}$$

$$sNorm = \begin{cases} \dfrac{s}{d} & \text{if } n \text{ odd} \\ \dfrac{s-1}{d} & \text{if } n \text{ even} \end{cases}$$

The expression of approximated integrand $\tilde{I}(\phi,c,n)$ is then given in function of Q ($\phi$c,n) by:

$$\tilde{I}(\phi, c, n) = \begin{cases} sNorm(c, n)(Q(\phi, c, n) - vShift(c, n)) & \text{if } n \text{ odd} \\ sNorm(c, n)(Q(\phi, c, n) - vShift(c, n)) + 1 & \text{if } n \text{ even} \end{cases} \quad (16)$$

As can be checked, thanks to the choices of sNorm and vShift, the relations below stand (omitting c and n dependencies in $\tilde{I}$ arguments for sake of conciseness):

$$\tilde{I}(0)=s, \tilde{I}(\pm\pi/2)=0 \text{ for } n \text{ odd}, \tilde{I}(\pm\pi/2)=1 \text{ for } n \text{ even}.$$

Based on equations (10), (14) and (16), it can then be noted that an approximation $\tilde{G}(x,c,\delta,n)$ of G(x,c,$\delta$,n) is given by (omitting c and n dependencies in the arguments of the right side for sake of conciseness):

$$\tilde{G}(x, c, \delta, n) = \quad (17)$$

$$\begin{cases} \left\{ sNorm\left( \begin{aligned} &\int_{-\delta}^{x-\delta} P(\varphi) - \int_{-\delta-\pi}^{x-\delta-\pi} P(\varphi) - \\ &\int_{-\delta+\pi}^{x-\delta+\pi} P(\varphi) - x \cdot vShift \end{aligned} \right) \right\} & \text{if } n \text{ odd} \\ \left\{ sNorm\left( \begin{aligned} &\int_{-\delta}^{x-\delta} P(\varphi) + \int_{-\delta-\pi}^{x-\delta-\pi} P(\varphi) + \\ &\int_{-\delta+\pi}^{x-\delta+\pi} P(\varphi) - x \cdot vShift \end{aligned} \right) + x \right\} & \text{if } n \text{ even} \end{cases}$$

According to the present implementations, the peak-functions P have a known antiderivative expression, which makes equation (17) particularly attractive for computations.

In a variant configuration, the upwards and downwards P translations are different from $\pi$, advantageously between 3$\pi$/4 and 3$\pi$/2, and preferably larger than $\pi$.

For the simpler family of implementations, a single normalized peak-shape function P ($\phi$,c,n) is used in the approximations. Accordingly, the approximated integrand $\tilde{I}(\phi,c,n)$ is given by:

$$\tilde{I}(\phi, c, n) = \begin{cases} sNorm(c, n)(P(\phi, c, n) - vShift(c, n)) & \text{if } n \text{ odd} \\ sNorm(c, n)(P(\phi, c, n) - vShift(c, n)) + 1 & \text{if } n \text{ even} \end{cases} \quad (18)$$

with (omitting c and n dependencies in arguments for sake of conciseness):

$$vShift = P\left(\frac{3\pi}{2}\right); d = 1 - vShift; sNorm = \begin{cases} \dfrac{s}{d} & \text{if } n \text{ odd} \\ \dfrac{s-1}{d} & \text{if } n \text{ even} \end{cases} \quad (19)$$

The selection and parameterization of appropriate normalized peak-shape functions P ($\phi$,c,n) will now be developed, in relation with both sophisticated families and simpler families of implementations. In the following, even values of n exponent are considered, though similar processes apply to odd values.

In a first selection of the peak-shape functions P, those are Lorentzian functions $P_L$, of the form:

$$P_L(\phi, c, n) = \frac{1}{1 + \alpha(c, n)\phi^2} \quad (20)$$

where $\alpha$ is a parameter depending on c and n which specifies the function $P_L$, determined by the computation module 114.

In an advantageous determination mode of $P_L$, the value of $I(\phi,c,n)$ at half-width $x_\omega$ is equalized with the value of $P_L$ at a shifted abscissa with respect to $x_\omega$. The offset, noted bias, enables to account for the operations (translation shifting, scaling, sum) applied to $P_L$ for constituting the approximated integrand $\tilde{I}(\phi,c,n)$—formula (16) for the triple-peak function and (18) for the single-peak function. Namely:

$$P_L(x_\omega + \text{bias}, c, n) = \frac{I(x_\omega, c, n)}{s}$$

which leads to:

$$\alpha(c, n) = \frac{s - I(x_\omega, c, n)}{I(x_\omega, c, n) \cdot (x_\omega + \text{bias})^2} \qquad (21)$$

The value of bias differs depending on the selection of the triple-peak or single-peak formula. For the triple-peak (sophisticated solution), it appears appropriate to select the following value:

$$\text{bias} = 0.1984\left(\exp\left(1.7\left(\left(\frac{4x_\omega}{\pi}\right)^3\right) - 1\right)\right) \qquad (22)$$

while for the single-peak solution, the following choice proves adequate:

$$\text{bias} = 0.3225\left(\exp\left(0.7\left(\left(\frac{4x_\omega}{\pi}\right)^{3.1}\right) - 1\right)\right) \qquad (23)$$

The relevance of those empirical formulae for the bias factor is confirmed by experimental measurements.

As previously mentioned, a key aspect of the selected peak-shape functions consists in the knowledge of an analytical expression for their antiderivative. As regards the Lorentzian function of formula (20), this is given by (arguments c and n being omitted in functions for sake of conciseness):

$$\int P_L(\phi) = \frac{\arctan(\sqrt{\alpha} \cdot \phi)}{\sqrt{\alpha}} \qquad (24)$$

which leads notably to the following:

$$\int_{-\delta}^{x-\delta} P_L(\phi, c, n) = \frac{1}{\sqrt{\alpha}}\left(\arctan(\sqrt{\alpha}((x-\delta))) - \arctan(\sqrt{\alpha}(-\delta))\right)$$

Having in mind that:

$$\arctan(x) - \arctan(y) = \arctan\left(\frac{x-y}{1+xy}\right)[\text{mod}\pi]$$

this leads to the following formula:

$$\int_{-\delta}^{x-\delta} P_L(\phi) = \frac{1}{\sqrt{\alpha}} \arctan\left(\frac{\sqrt{\alpha} \cdot x}{1 + \alpha(-\delta)(x-\delta)}\right)[\text{mod}\pi] \qquad (25)$$

It deserves noting that formula (25) involves a limited number of computations of arc tangent function, which is costly and requires typically around 20 ALU (Arithmetic Logic Unit) instructions in a GPU. Notably, only three such arctan evaluations need to be executed for formula (17).

The approximated integrand $\tilde{I}(\phi,c,n)$ can then be computed by the module 115, based on the outputs of modules 112, 113 and 114.

According to a second selection of the normalized peak-shape functions P, those are a linear combination of Lorentzian functions $P_L$ and Pearson type VII functions parameterized with a predetermined number m, noted $P_{Pm}$. Such a Pearson-type function is defined by:

$$P_{Pm}(\phi, c, n) = \frac{1}{(1 + \beta(c, n, m)\phi^2)^m} \qquad (26)$$

where $\beta$ is a parameter depending on c, n and m, which specifies the function $P_{Pm}$, determined by the computation module 114.

More precisely, the linear combination of the peak-shape functions is an affine combination (i.e. a linear combination for which the sum of the related coefficients is 1). This amounts to having the approximated integrand $\tilde{I}(\phi,c,n)$ being an affine combination of the approximated integrands $\widetilde{I_L}(\phi, c,n)$ and $\widetilde{I_{Pm}}(\phi,c,n)$ corresponding respectively to the Lorentzian and Pearson peak-shape functions (though the coefficients are not the same for the peak-shape functions and the approximated integrands). That relation is given by:

$$\tilde{I}(\phi,c,n) = \mu \widetilde{I_L}(\phi,c,n) + (1-\mu)P_{Pm}\widetilde{I_{Pm}}(\phi,c,n) \qquad (27)$$

with coefficient $\mu$ being comprised between 0 and 1.

In a particular implementation, coefficient $\mu$ is computed from a further parameter derived from the integrand function I by the module 113 (in addition to the maximum value s and the half-width abscissa $x_\omega$): the value $I(x_{tail},c,n)$ taken by integrand I at a tail abscissa $x_{tail}$. The latter is advantageously chosen as:

$$x_{tail} = x_\omega + 0.3946(1 - (1 - x_\omega)^{12}) \qquad (28)$$

Then, coefficient $\mu$ depends on c and n, and is obtained by module 114 by equalizing the values at $x_{tail}$ of the approximated integrand $\tilde{I}$ and the integrand I. This leads to the following value:

$$\mu(c, n) = \frac{\widetilde{I_{Pm}}(x_{tail}, c, n) - I(x_{tail}, c, n)}{\widetilde{I_{Pm}}(x_{tail}, c, n) - \widetilde{I_L}(x_{tail}, c, n)} \qquad (29)$$

That choice proves particularly appropriate in efficient implementations, which can be explained by the fact that in the tail of the integrand, the Lorentzian approximation tends to an overestimation while the Pearson approximation tends by contrast to an underestimation. The present weighting therefore provides a relative balance between both.

In a similar way as for the Lorentzian function, the parameter $\beta$ is computed by the module 114 by using the approximated half-width abscissa $x_\omega$, as well as an offset $\text{bias}_m$, which depends on c, n and m:

$$P_{Pm}(x_\omega + \text{bias}_m, c, n) = \frac{I(x_\omega, c, n)}{s} \qquad (30)$$

so that:

$$\beta(c, n, m) = \frac{s - \sqrt[m]{I(x_\omega, c, n)}}{\sqrt[m]{I(x_\omega, c, n)} \cdot (x_\omega + \text{bias})^2}$$

Two particular values of parameter m in the Pearson function provide advantageous embodiments: 1.5 and 2. For both of them, relatively simple antiderivatives expressions are known (arguments c and n being omitted in the functions for sake of conciseness):

$$\int P_{P1.5}(\phi) = \frac{\phi}{\sqrt{\beta\phi^2 + 1}} \quad (31)$$

$$\int P_{P2}(\phi) = \frac{1}{2}\left(\frac{\phi}{\sqrt{\beta\phi^2 + 1}} + \frac{\arctan(\sqrt{\beta}\phi)}{\sqrt{\beta}}\right) \quad (32)$$

The integral for m=1.5 is simpler to evaluate, while the integral for m=2 provides slightly more accurate estimations of the radiance.

Like for the Lorentzian function, the value of $bias_m$ depends on the selection of the triple-peak or single-peak formula. For the triple-peak (sophisticated solution), it appears appropriate to select the following values:

$$bias_{1.5} = 0.1047\left(\exp\left(2.1\left(\left(\frac{4x_\omega}{\pi}\right)^{3.4}\right) - 1\right)\right) \quad (33)$$

$$bias_2 = 0.0963\left(\exp\left(2.1\left(\left(\frac{4x_\omega}{\pi}\right)^4\right) - 1\right)\right) \quad (34)$$

and for the single-peak (simpler solution):

$$bias_{1.5} = 0.3391\left(\exp\left(0.5\left(\left(\frac{4x_\omega}{\pi}\right)^{3.9}\right) - 1\right)\right) \quad (35)$$

$$bias_2 = 0.3497\left(\exp\left(0.4\left(\left(\frac{4x_\omega}{\pi}\right)^{4.5}\right) - 1\right)\right) \quad (36)$$

Figure 8:
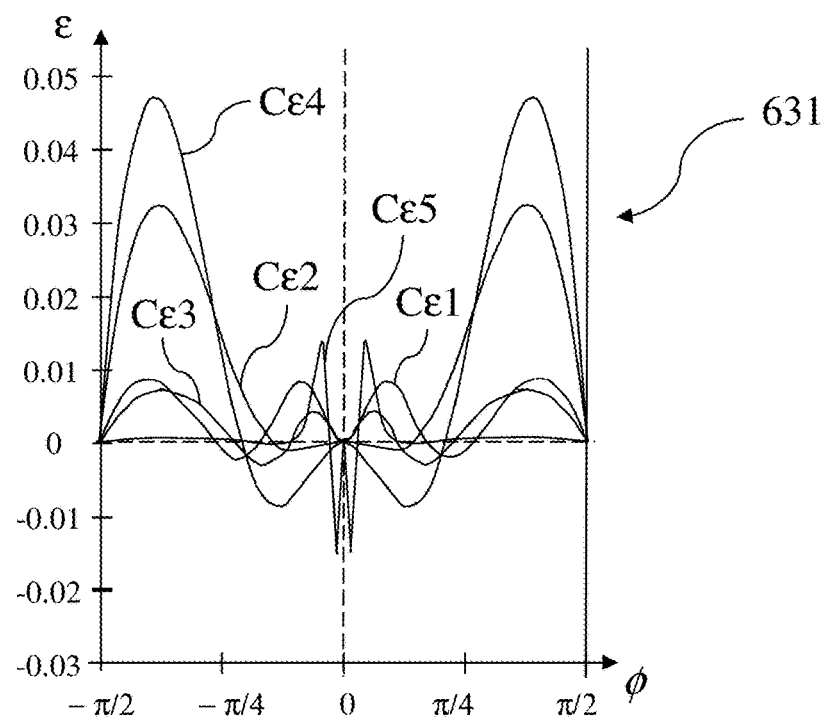
FIG. 8 represents the relative error in approximating the plots of FIG. 5A with related single-peak approximations obtained with the device of FIG. 1 by a combination of a Lorentzian function and a Pearson type VII function having a parameter 2.0.

In efficient implementations, the approximate integrand function as computed above proves globally very close to the effective integrand function (represented on FIGS. 5A and 5B), especially for Phong exponents n larger than 50. For sake of example, the relative error E obtained for the combined Lorentzian-Pearson functions with m being worth 2 and the single peak-shape method is represented on FIG. 8 for various values of c and n. The corresponding plotted curves 631, noted Cε1 to Cε5, are respectively associated with the following (c,n) pairs:

(0.9; 50), (0.7;100), (0.95;200), (0.5;500), (0.999;500)

Though the first representation of the Phong model expressed in equation (2) has been adopted in the presentation above, similar operations can be applied to the second representation of equation (3). In particular, Arvo's developments cited above lead to appropriate boundary integrals for double-axis moments of A with respect to $\vec{r}$ (n-power) and $\vec{v}$ (1-power)—which amounts to the combination of two single-axis moments. In compliance with the present disclosure, solutions similar to those laid out in the present disclosure are then implemented.

Figure 9A:
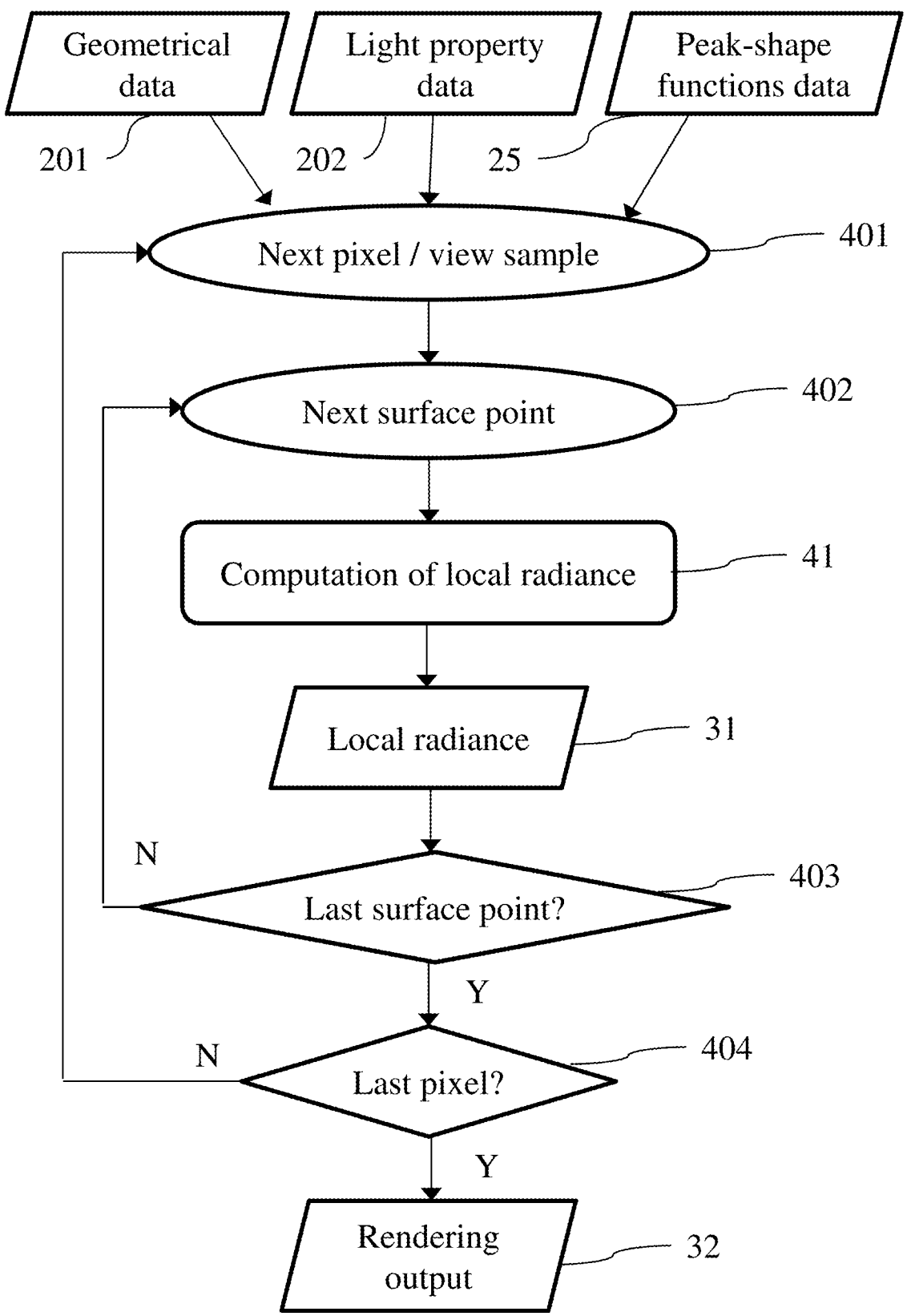
FIG. 9A is a flow chart showing successive rendering steps executed with notably the device for estimating a glossy part of FIG. 1.

In operation, as illustrated on FIGS. 9A, 9B and 9C, the device 1 proceeds preferably as follows in a rendering operation. Exploited inputs include geometrical data 201 and light property data 202 extracted from the storage resources 20 and peak-shape functions data 25 provided by user selections or default options. The latter data 25 comprise the type of used peak-shape function(s), such as notably Lorentzian or combined Lorentzian-Person, the corresponding associated parameters, such as m for a Pearson function, and the way of exploitation, such as the triple-peak or single-peak method developed above.

A next pixel or view sample is considered at step 401—which is advantageously processed in parallel for various pixels. A next surface point M is also processed for the current pixel at step 402, in compliance with known rendering processes. The local radiance 31 at point M for the considered pixel, which is associated with a viewing direction, is then computed at step 41, as laid out above and summed up hereinafter. Further surface points (step 403) and further pixels (step 404) are dealt with until the whole set has been processed, and the complete rendering output is available (step 32), which is reiterated for moving images.

Figure 9B:
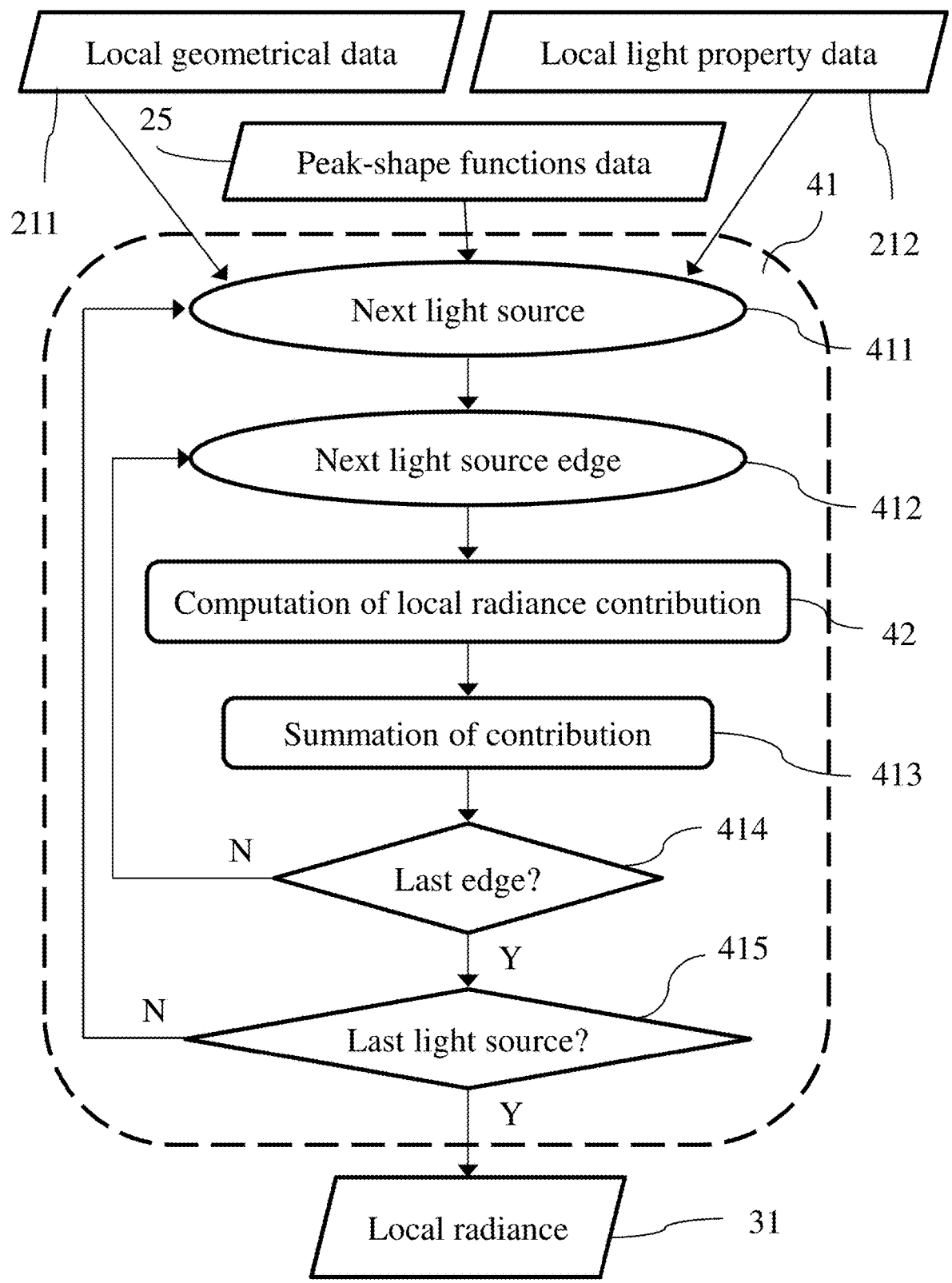
FIGS. 9B and 9C are detailing steps of the flow chart of FIG. 9A, executed by the device for estimating a glossy part of FIG. 1.
Figure 9C:
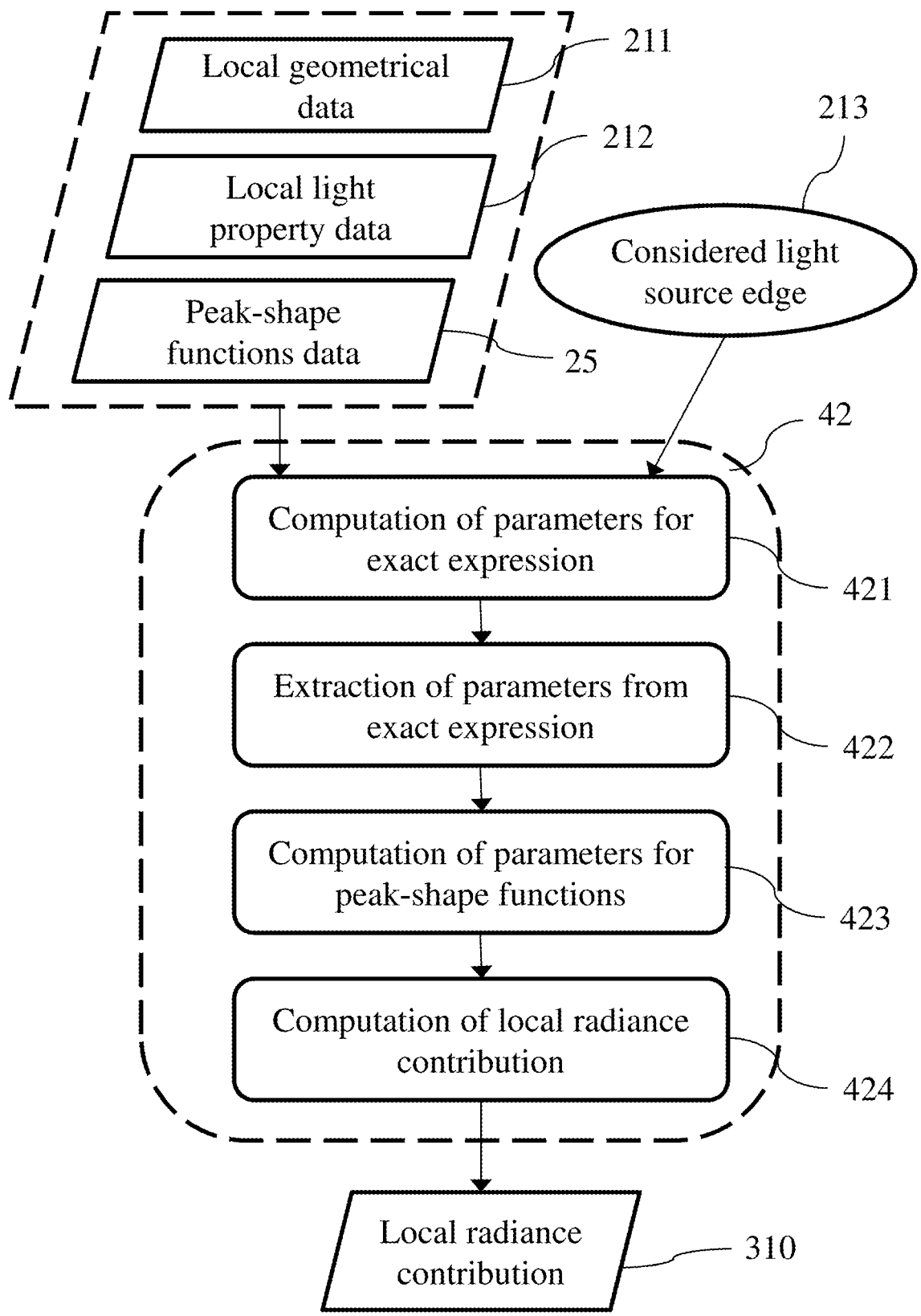

The step 41 of computation of local radiance includes more specifically the following operations (FIG. 9B). They are based on local geometrical data 211 and local light property data 212 (including notably the glossiness exponent n) that are derived from the geometrical data 201 and light property data 202 through the pending consideration of given surface point and viewing direction, and on the peak-shape functions data 25.

A next light source relevant to the current surface point is considered at step 411, and a next light source edge 412 of that light source is considered at step 412. The computation of local radiance contribution for that light source edge is then effected at step 42, and that contribution is summed to the other contributions (over the light source edges and light sources, for the pending surface point and viewing direction) at step 413. Those operations are effected until all edges of the current light source have been processed (step 414), and until all relevant light source have been considered (step 415). The local radiance 31 is thereby obtained.

More in detail regarding the computation of local radiance contribution for a given light source edge 213 (FIG. 9C), the following steps are performed:

at step 421, parameters are computed in relation with an exact expression of the radiance; those include the edge aperture $\phi_j$, parameters a, b and then c, δ, as developed above;

at step 422, parameters are extracted from the exact expression; those include the maximum value s, the estimated half-width $x_\omega$, and related integrand value $I(x_\omega)$ and if a combination Lorentzian-Pearson function is exploited, the tail abscissa $x_{tail}$ and related integrand value $I(x_{tail})$;

at step 423, appropriate parameters are computed for specifying the exploited peak-shape functions and induced approximated integrands; in the presently disclosed advantageous implementations, those can include any relevant values among parameters α, β, μ, bias, $bias_m$, $\widetilde{I_L}(x_{tail},c,n)$, $\widetilde{I_{Pm}}(x_{tail},c,n)$, as well as sNorm and vShift;

at step 424, the local radiance contribution 310 is computed, by means of formulae derived from analytical expressions of the antiderivatives of the exploited peak-shape functions.

In test comparisons with a recurrence method giving reference results (which correspond to an exact solution), timing and error measurements (Root Mean Square Error) show that solutions presently disclosed outperform the recurrence method in many scenarios, especially for Phong exponents n larger than 50. The combination of a single Lorentzian and Pearson function proves to offer a particularly good compromise in terms of computation efficiency and visual quality, with few noticeable differences.

A particular apparatus 5, visible on FIG. 10, is embodying the device 1 described above. It corresponds for example to a personal computer (PC), a laptop, a tablet, a smartphone or a games console—such as a specialized games console producing and displaying images live. The apparatus 5 comprises the following elements, connected to each other by a bus 55 of addresses and data that also transports a clock signal:
- a microprocessor 51 (or CPU);
- a graphics card 52 comprising several Graphical Processor Units (or GPUs) 520 and a Graphical Random Access Memory (GRAM) 521;
- a non-volatile memory of ROM (Read Only Memory) type 56;
- a Random Access Memory or RAM 57;
- one or several I/O (Input/Output) devices 54 such as for example a keyboard, a mouse, a joystick, a webcam; other modes for introduction of commands such as for example vocal recognition are also possible;
- a power source 58; and
- a radiofrequency unit 59.

The apparatus 5 also comprises a display device 53 of display screen type directly connected to the graphics card 52 to display synthesized images calculated and composed in the graphics card, for example live. The use of a dedicated bus to connect the display device 53 to the graphics card 52 offers the advantage of having much greater data transmission bitrates and thus reducing the latency time for the displaying of images composed by the graphics card. According to a variant, a display device is external to apparatus 5 and is connected thereto by a cable or wirelessly for transmitting the display signals. The apparatus 5, for example the graphics card 52, comprises an interface for transmission or connection adapted to transmit a display signal to an external display means such as for example an LCD or plasma screen or a video-projector. In this respect, the RF unit 59 can be used for wireless transmissions.

It is noted that the word "register" used in the description of memories 521, 56, and 57 designates in each of the memories mentioned, both a memory zone of low capacity (some binary data) as well as a memory zone of large capacity (enabling a whole program to be stored or all or part of the data representative of data calculated or to be displayed). Also, the registers represented for GRAM 521 can be arranged and constituted in any manner, and each of them does not necessarily correspond to adjacent memory locations and can be distributed otherwise (which covers notably the situation in which one register includes several smaller registers).

When switched-on, the microprocessor 51 loads and executes the instructions of the program contained in the RAM 57.

The random access memory 57 comprises notably:
in a register 570, the operating program of the microprocessor 51 responsible for switching on the apparatus 5,
in a register 571, parameters representative of the scene (for example modelling parameters of the object(s) of the scene, lighting parameters of the scene);
in a register 572, peak-shape functions data exploited for estimating the radiations.

The algorithms implementing the steps of the method specific to the present disclosure and described above are stored in the memory GRAM 521 of the graphics card 52 associated with the apparatus 5 implementing those steps. When switched on and once the parameters 571 and 572 representative of the environment and peak-shape functions data are loaded into the RAM 57, the graphic processors 520 of graphics card 52 load those parameters into the GRAM 521 and execute the instructions of those algorithms in the form of microprograms of "shader" type using HLSL (High Level Shader Language) language or GLSL (OpenGL Shading Language) for example.

The random access memory GRAM 521 comprises notably:
in a register 5211, the parameters representative of the scene,
in a register 5212, the loaded peak-shape functions data,
in a register 5213, local radiance computed in the frame of the rendering operations.

According to a variant, at least some of the data pertaining to primitives are stored in the RAM 57 and processed by the microprocessor 51. This variant however causes greater latency time in the composition of an image comprising a representation of the environment composed from microprograms contained in the GPUs 520 as the data must be transmitted from the graphics card to the random access memory 57 passing by the bus 55, for which the transmission capacities are generally inferior to those available in the graphics card for transmission of data from the GPUs 520 to the GRAM 521 and vice-versa.

According to another variant, the power supply 58 is external to the apparatus 1.

Naturally, the present disclosure is not limited to the embodiments previously described.

In particular, the present disclosure extends to any device implementing the described method for determining (or estimating) a glossy part of a radiation. The implementations described herein may take the form of, for example, a method or a process, an apparatus, a software program, a data stream, or a signal. Even if only discussed in the context of a single kind of implementation (for example, discussed only as a method or a device), the implementation of features discussed may also be implemented in other kinds (for example a program).

An apparatus may be implemented in, for example, appropriate hardware, software, and firmware. A relevant apparatus may include a web server, a set-top box, a laptop, a personal computer, a cell phone, a PDA, and other communication devices. As should be clear, the equipment may be mobile and even installed in a mobile vehicle.

The methods may be implemented in an apparatus such as, for example, a processor, which refers to processing devices in general, including, for example, a computer, a microprocessor, an integrated circuit, or a programmable logic device. Additionally, they may be implemented by instructions being performed by a processor, and such instructions (and/or data values produced by an implementation) may be stored on a processor-readable medium such as, e.g., an integrated circuit, a software carrier or other storage device such as, e.g., a hard disk, a compact disc ("CD"), an optical disc (such as, for example, a DVD, often referred to as a digital versatile/video disc), a RAM or a ROM. Instructions may form an application program tangibly embodied on a processor-readable medium. They may be, for example, in hardware, firmware, software, or a combination.

A processor may be characterized as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such signals may be formatted, for example, as an electromagnetic wave (for example, using a radio frequency portion of spectrum) or as a baseband signal. The formatting may include, for example, encoding a data stream and modulating a carrier with the encoded data stream. The information that the signals carry may be, for example, analog or digital information. The signals may be transmitted over a variety of different wired or wireless links, and may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A device for processing and rendering scene data wherein the scene data include data for determining a glossy part of a radiation coming from a surface illuminated by at least one area light source having at least one polygonal source surface bounded by light edge curves, said light edge curves being straight lines, said device comprising at least one processor configured to:
   for each of said light edge curves, determine at least one integrand function representative of a contribution of said light edge curve to said glossy part, said integrand function being based on a Phong reflection model,
   for each of said light edge curves, approximate said at least one determined integrand function using at least one peak-shape function having a known antiderivative,
   determine said glossy part from the known antiderivatives of each of said peak-shape functions along said edge curves, said glossy part corresponding to a summation of integrations of each of said integrand functions along each of said light edge curves,
   wherein said radiation is scattered at a point towards an observer and is defined by a hemispherical integral over a solid angle sustained by said at least one polygonal source surface, and said at least one peak-shape function comprises an affine combination of a Lorentzian function and a Pearson function, and in that said integrand function having a tail value at a tail abscissa, said at least one processor is configured to determine said affine combination by using parameters representative of said tail value and said tail abscissa, and
   output and render pixels of an image associated with said glossy part.

2. The device according to claim 1, wherein said at least one processor is configured to determine said glossy part when said glossy part is reflected by said illuminated surface.

3. The device according to claim 2, wherein said glossy part corresponds to a specular term of the Phong reflection model.

4. The device according to claim 1, wherein said at least one processor is configured to determine said glossy part coming from points of said illuminated surface, and said at least one integrand function depends on the positioning of said points with respect to said edge curves and on viewing directions with regard to said points.

5. The device according to claim 1, wherein said at least one integrand function having a maximal height at a peak abscissa and having a floor value at side abscissas, said at least one processor is configured to determine said integrand function by using parameters representative of said maximal height, peak abscissa, floor value and side abscissas.

6. The device according to claim 1, wherein said at least one integrand function having a maximal height and reaching a predefined ratio of said maximal height at a width abscissa, said at least one processor is configured to determine said integrand function by using parameters representative of said maximal height and width abscissa.

7. The device according to claim 6, wherein said at least one peak-shape function being parameterized with at least one adjustment parameter, said at least one processor is configured to determine said at least one adjustment parameter by using said parameters representative of said maximal height and width abscissa.

8. The device according to claim 1, wherein said at least one processor is configured to determine said integrand function by using a linear combination of said at least one peak-shape function in an untranslated form, in a rightward translated form, and in a leftward translated form.

9. The device according to claim 1, wherein said at least one peak-shape function comprises at least one of a Lorentzian function and a Pearson function.

10. The device according to claim 9, wherein said at least one peak-shape function comprises an affine combination of a Lorentzian function and a Pearson function, and in that said integrand function having a tail value at a tail abscissa, said at least one processor is configured to determine said affine combination by using parameters representative of said tail value and tail abscissa.

11. The device according to claim 1, wherein said device comprises a programmable rendering pipeline adapted to compute said glossy part.

12. A method for processing and rendering scene data wherein the scene data include data for determining a glossy part of a radiation coming from a surface illuminated by at least one area light source having at least one polygonal source surface bounded by light edge curves, said light edge curves being straight lines, wherein said method comprises:
   for each of said light edge curves, determining at least one integrand function representative of a contribution of said light edge curve to said glossy part, said integrand function being based on a Phong reflection model, said glossy part corresponding to a summation of integrations of said integrand functions along said light edge curves,
   for each light edge curve, approximating each of said determined at least one integrand function using at least one peak-shape function having a known antiderivative,
   determining said glossy part from the known antiderivatives of each of said peak-shape functions, said glossy part corresponding to a summation of integrations of said determined integrand functions along said light edge curves, wherein said radiation is scattered at a point towards an observer and is defined by a hemispherical integral over a solid angle sustained by said at least one polygonal source surface, and said at least one peak-shape function comprises an affine combination of a Lorentzian function and a Pearson function, and in that said integrand function having a tail value at a tail abscissa, said at least one processor is configured to determine said affine combination by using parameters representative of said tail value and said tail abscissa, and outputting and rendering pixels of an image associated with said glossy part.

13. The method according to claim 12, wherein said glossy part is determined when said glossy part is reflected by said illuminated surface.

14. The method according to claim 13, wherein said glossy part corresponds to a specular term of the Phong reflection model.

15. The method according to claim 12, wherein said glossy part is determined as coming from points of said illuminated surface, and said at least one integrand function depends on the positioning of said points with respect to said edge curves and on viewing directions with regard to said points.

16. The method according to claim 12, wherein said at least one integrand function having a maximal height at a peak abscissa and having a floor value at side abscissas, said integrand function is determined by using parameters representative of said maximal height, peak abscissa, floor value and side abscissas.

17. The method according to claim 12, wherein said at least one integrand function having a maximal height and reaching a predefined ratio of said maximal height at a width abscissa, said integrand function is determined by using parameters representative of said maximal height and width abscissa.

18. The method according to claim 17, wherein said at least one peak-shape function being parameterized with at least one adjustment parameter, said at least one adjustment parameter is determined by using said parameters representative of said maximal height and width abscissa.

19. The method according to claim 12, wherein said integrand function is determined by using a linear combination of said at least one peak-shape function in an untranslated form, in a rightward translated form, and in a leftward translated form.

20. The method according to claim 12, wherein said at least one peak-shape function comprises at least one of a Lorentzian function and a Pearson function.

21. The method according to claim 20, wherein said at least one peak-shape function comprises an affine combination of a Lorentzian function and a Pearson function, and in that said integrand function having a tail value at a tail abscissa, the method further comprising determining said affine combination by using parameters representative of said tail value and tail abscissa.

22. A non-transitory processor readable medium having stored therein instructions for causing a processor to perform the method according to claim 12.

* * * * *